(12) United States Patent  (10) Patent No.: US 9,170,138 B2
Giovangrandi et al.  (45) Date of Patent: Oct. 27, 2015

(54) ENHANCED MICROFLUIDIC ELECTROMAGNETIC MEASUREMENTS

(75) Inventors: Laurent Giovangrandi, Palo Alto, CA (US); Antonio J. Ricco, Los Gatos, CA (US); Gregory Kovacs, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1046 days.

(21) Appl. No.: 13/250,605

(22) Filed: Sep. 30, 2011

(65) Prior Publication Data

US 2012/0084022 A1  Apr. 5, 2012

Related U.S. Application Data

(60) Provisional application No. 61/388,916, filed on Oct. 1, 2010.

(51) Int. Cl.
  *G01F 1/58*  (2006.01)
  *G06F 19/00*  (2011.01)
(52) U.S. Cl.
  CPC  *G01F 1/58* (2013.01); *G01F 1/584* (2013.01); *G01F 1/586* (2013.01); *G01F 1/588* (2013.01)
(58) Field of Classification Search
  CPC ........... G01F 1/58; G01F 1/588; G01F 1/584; G01F 1/586; G06F 19/00
  USPC .......................................................... 702/45
  See application file for complete search history.

(56) References Cited

U.S. PATENT DOCUMENTS

| | | | | |
|---|---|---|---|---|
| 2003/0102854 | A1* | 6/2003 | Gascoyne et al. | 324/71.4 |
| 2006/0200039 | A1* | 9/2006 | Brockway et al. | 600/547 |
| 2007/0238112 | A1* | 10/2007 | Sohn et al. | 435/6 |
| 2009/0048805 | A1* | 2/2009 | Kaduchak et al. | 702/179 |
| 2009/0283148 | A1* | 11/2009 | Shinoda et al. | 137/2 |
| 2010/0137163 | A1* | 6/2010 | Link et al. | 506/16 |

(Continued)

OTHER PUBLICATIONS

C. Bernabini, et al., "Micro-impedance spectroscopy for detection and discrimination of bacteria and micro-particles", Thirteenth International Conference on Miniaturized Systems for Chemistry and Life Sciences, Nov. 1-5, 2009, Jeju, Korea.*

(Continued)

*Primary Examiner* — Mohamed Charioui
*Assistant Examiner* — Ruihua Zhang
(74) *Attorney, Agent, or Firm* — Eugene J. Molinelli; Beusse Wolter Sanks & Maire, PLLC

(57) ABSTRACT

Techniques for enhanced microfluidic impedance spectroscopy include causing a core fluid to flow into a channel between two sheath flows of one or more sheath fluids different from the core fluid. Flow in the channel is laminar. A dielectric constant of a fluid constituting either sheath flow is much less than a dielectric constant of the core fluid. Electrical impedance is measured in the channel between at least a first pair of electrodes. In some embodiments, enhanced optical measurements include causing a core fluid to flow into a channel between two sheath flows of one or more sheath fluids different from the core fluid. An optical index of refraction of a fluid constituting either sheath flow is much less than an optical index of refraction of the core fluid. An optical property is measured in the channel.

48 Claims, 28 Drawing Sheets

(56) References Cited

U.S. PATENT DOCUMENTS

2011/0135635 A1* 6/2011 Lazarides et al. .......... 424/133.1
2012/0135405 A1* 5/2012 Toumbas et al. ............. 435/6.11

OTHER PUBLICATIONS

S. Koster, et al., "Drop-based microfluidic devices for encapsulation of single cells", Lab Chip, 2008.*
D. Huh, et al., "Microfluidics for flow cytometric analysis of cells and particles", Institute of PHysics Publishing, 2005.*
Bernabini et al., "Micro-Impedance Spectroscopy for Detection and Discrimination of Bacteria and Micro-Particles", "Thirteenth International Conference on Miniaturized Systems for Chemistry and Life Sciences, Nov. 1-5, 2009, Jeju, Korea", Nov. 1, 2009, pp. 1641-1643.
Bernabini et al., "Micro-impedance cytometry for detection and analysis of micron-sized particles and bacteria", "Lab on a Chip", Nov. 9, 2010, pp. 1-6, Publisher: The Royal Society of Chemistry.
Evander et al., "Signal Improvement by Dielectric Focusing in Microfluidic Impedance Cytometers", "14th International Conference on Miniaturized Systems for Chemistry and Life Sciences—Oct. 7, 2010, Groningen, The Netherlands", Oct. 3, 2010, pp. 1277-1279.
Huh et al., "Use of Air-Liquid Two-Phase Flow in Hydrophobic Microfluidic Channels for Disposable Flow Cytometers", "Biomedical Microdevices", 2002, pp. 141-149, vol. 4, No. 2, Publisher: Kluweer Academic Publishers.
Kovacs, Gregory, T. A., "Initial Proposal NIH", May 2006, pp. 1-17.
Kovacs, Gregory, T. A., "Revised Proposal NIH", Mar. 2007, pp. 1-23.
"Research & Related other Project Information", Apr. 30, 2008, pp. 1-1.
Nieuwenhuis et al., "Integrated Coulter counter based on 2-dimensional liquid aperture control", "Sensors and Actuators", 2004, pp. 44-50, vol. B , No. 102, Publisher: Elsevier B.V.
Surmeian et al., "Three-Layer Flow Membrane System on a Microchip for Investigation of Molecular Transport", "Anal. Chem.", May 1, 2002, pp. 2014-2020, vol. 74, No. 9, Publisher: American Chemical Society.
Zhao et al, "Control and Applications of Immiscible Liquids in Microchannels", "J. Am. Chem. Soc.", 2002, pp. 5284-5285, vol. 124, No. 19, Publisher: American Chemical Society.

* cited by examiner

FIG. 1A
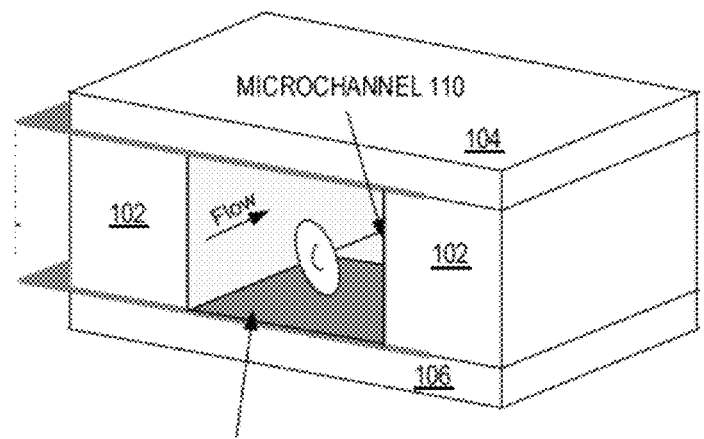
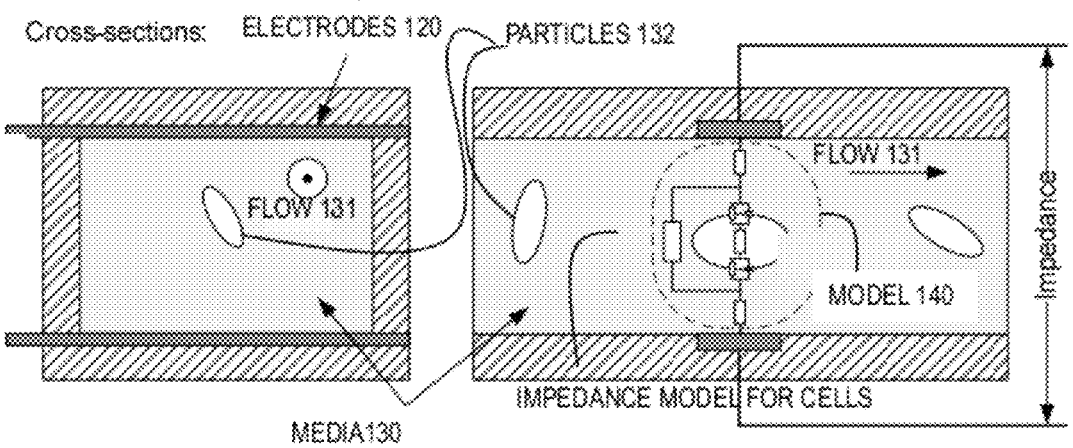
FIG. 1B      FIG. 1C

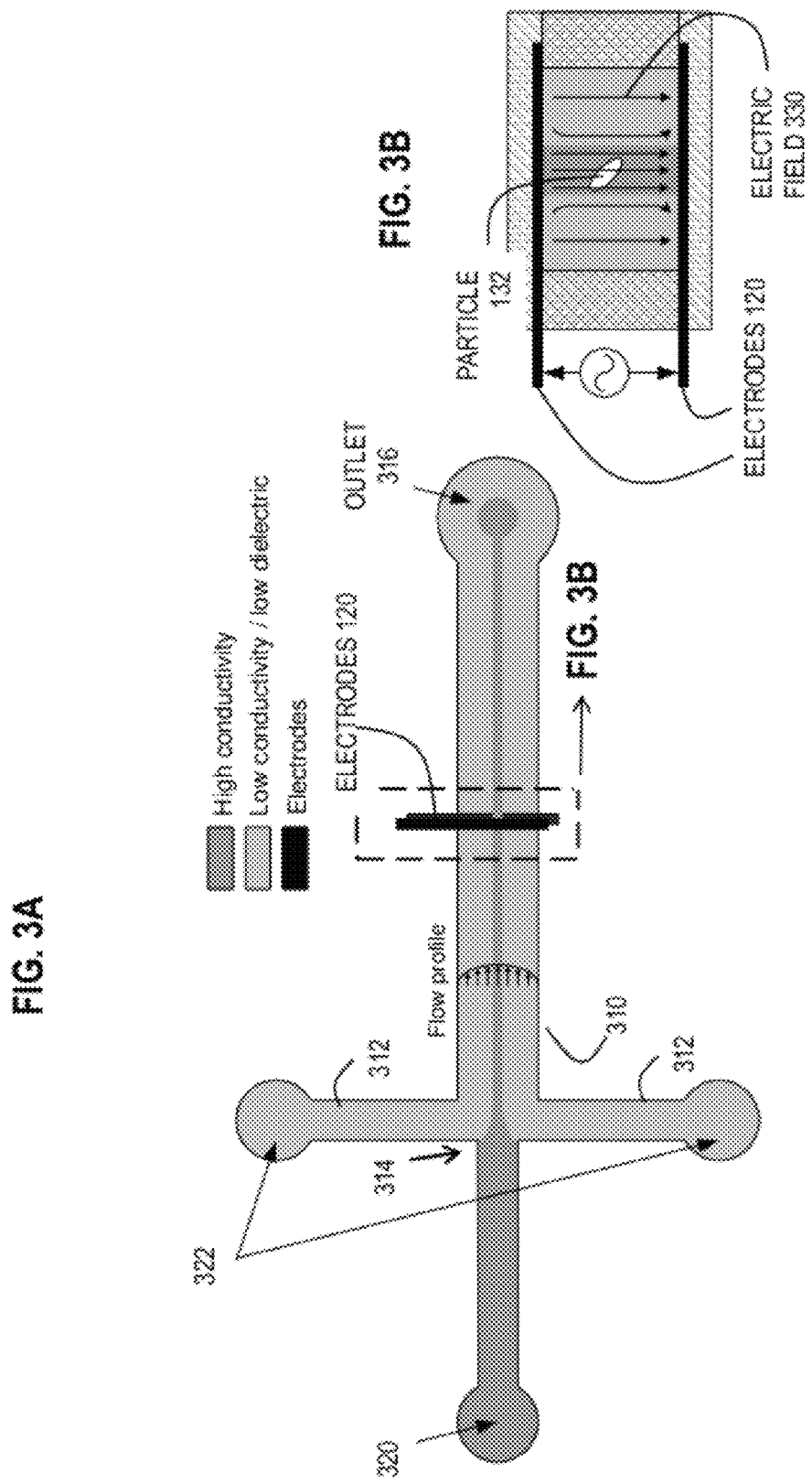

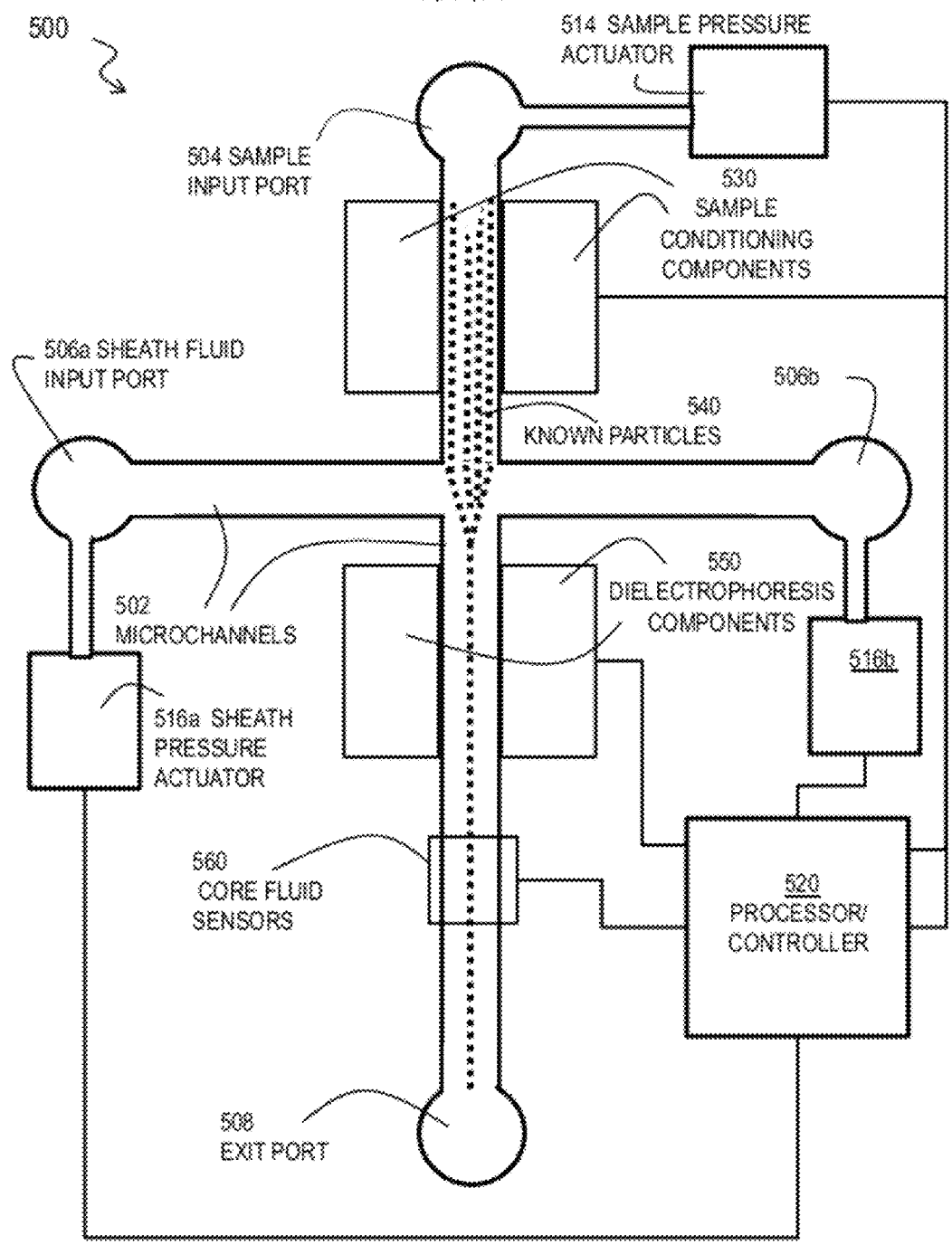

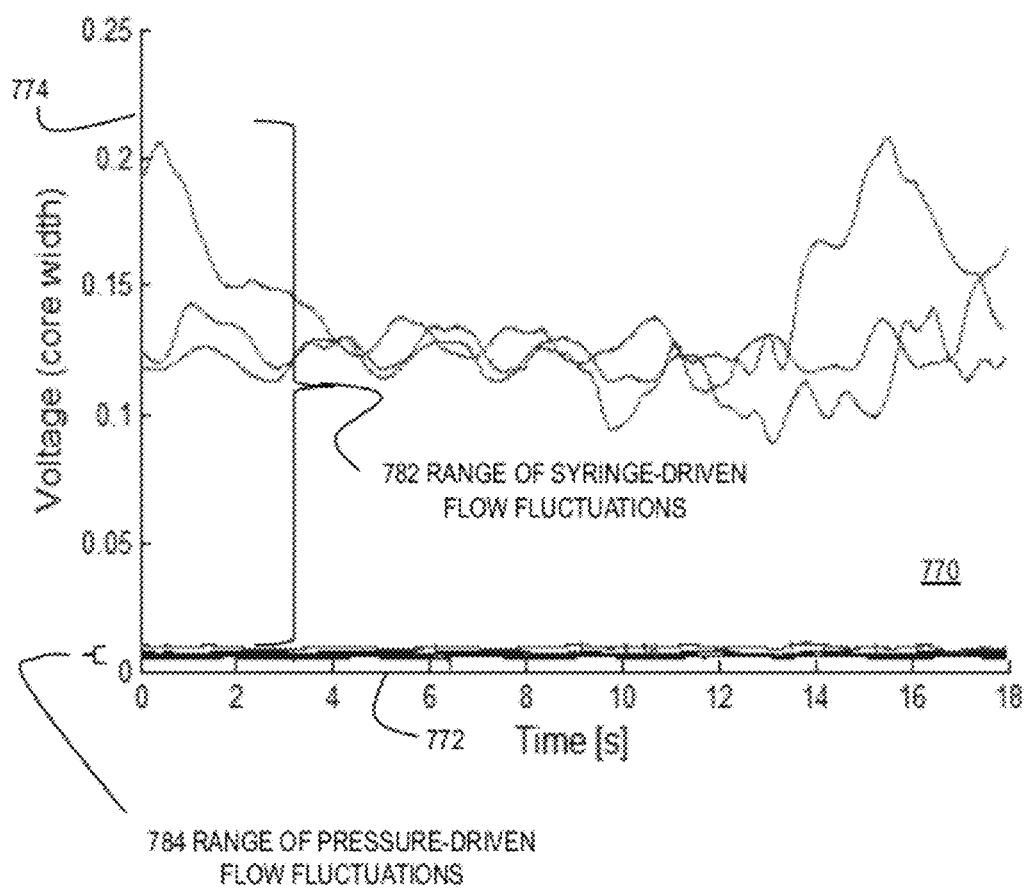

FIG. 10
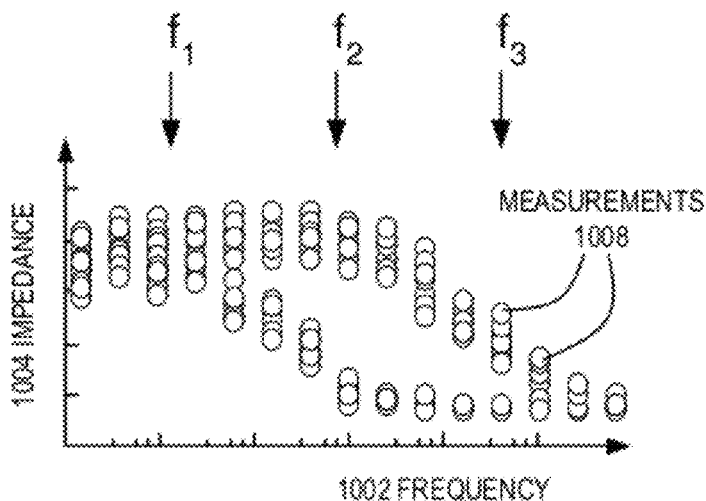
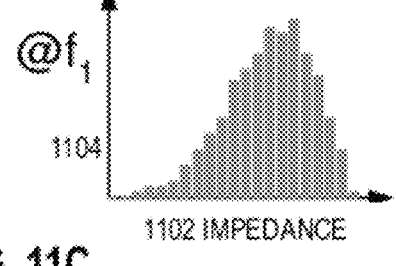
0.1 μM ADP
FIG. 11A
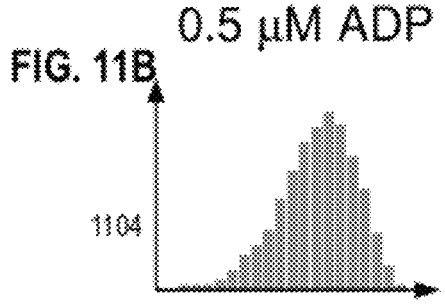
0.5 μM ADP
FIG. 11B
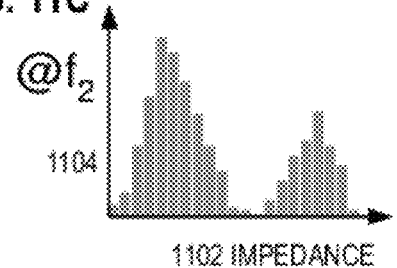
FIG. 11C
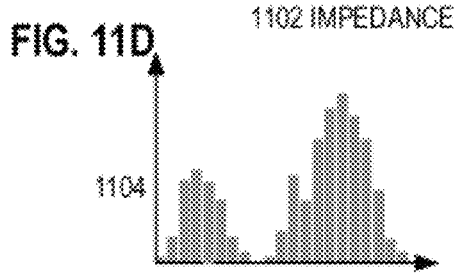
FIG. 11D
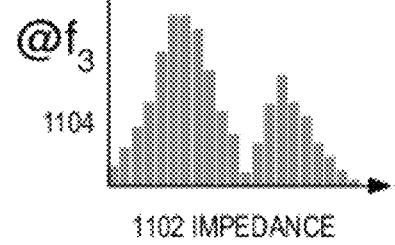
FIG. 11E
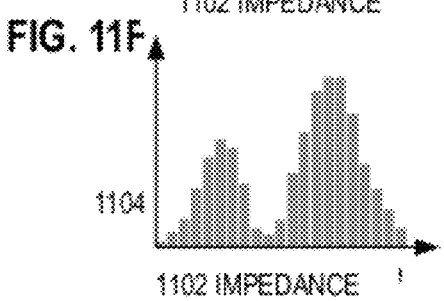
FIG. 11F

ENHANCED MICROFLUIDIC ELECTROMAGNETIC MEASUREMENTS

CROSS-REFERENCE TO RELATED APPLICATIONS

This application claims benefit of Provisional Appln. 61/388,916, filed Oct. 1, 2010, the entire contents of which are hereby incorporated by reference as if fully set forth herein, under 35 U.S.C. §119(e).

STATEMENT OF GOVERNMENTAL INTEREST

This invention was made with Government support under contract NNA04CC32A awarded by the NASA-Ames Research Center and under contract EB007390 awarded by the National Institutes of Health. The Government has certain rights in the invention.

BACKGROUND OF THE INVENTION

An impedance-based microfluidic flow cytometer uses a small channel in combination with control of the flow of fluid streams in that channel to guide cells or other particles between two or more electrodes that measure electrical impedance in the vicinity of each electrode or between pairs of electrodes. This principle has been applied in various embodiments, including several published micro flow cytometers. Note that the term flow cytometer is used loosely herein, as the apparatus can be used for the characterization of the impedance of a large variety of particles, not only cells.

SUMMARY OF THE INVENTION

Techniques are provided for enhanced electromagnetic (EM) measurements in low-shear laminar flows in microfluidic channels. Such techniques allow precise electrical impedance measurements of delicate or force-sensitive particles.

According to a first set of embodiments, a method includes causing a core fluid to flow into a channel between two sheath flows of one or more sheath fluids different from the core fluid. Flow in the channel is laminar. A dielectric constant of a fluid constituting either sheath flow is much less than a dielectric constant of the core fluid. The method further comprises determining impedance in the channel between at least a first pair of electrodes. In some of these embodiments, active feedback is used to control the width of the flow of the core fluid. For example, in some embodiments, a method includes controlling relative pressure or flow rate of a source of the core fluid compared to pressure or flow rate of a source of one or more of the sheath fluids by controlling the relative pressure or flow rate to stabilize a measurement of a property of the core fluid. In some embodiments, the property of the core fluid includes position or shape of the core flow in the channel, or both. In some embodiments, the position or shape of the core flow, or both, is stabilized based on impedance or optical measurements, e.g., to maintain a certain width or cross-section or position in the center of the channel or some combination. In some embodiments, the position or shape of the core flow, or both, is stabilized based on measurements of known particles included in the core flow.

In another set of embodiments, a method comprises causing a core fluid to flow into a channel between two sheath flows of one or more sheath fluids different from the core fluid. An optical index of refraction of a fluid constituting either sheath flow is much less than an optical index of refraction of the core fluid. The method further comprises measuring an optical property in the channel between an optical source and an optical detector.

In another set of embodiments, a method comprises causing a core fluid to flow into a channel between two sheath flows of one or more sheath fluids different from the core fluid. A value of a first electromagnetic property of a fluid constituting either sheath flow is substantially different from a value of the first electromagnetic property of the core fluid. Flow in the channel is laminar. The method also comprises measuring a second electromagnetic property in the channel using an electromagnetic signal that is concentrated in the core fluid by a difference in the value of the first electromagnetic property of either sheath flow and the value of the first electromagnetic property of the core fluid.

According to various other sets of embodiments, an apparatus comprises means to perform each step of one of the above methods; or a computer-readable storage medium is configured to cause an apparatus to perform one or more steps of one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which FIGS. 1A-1C are diagrams that illustrates a microfluidic flow cytometer, according to an embodiment;

FIG. 3A and FIG. 3B are diagrams that illustrate an apparatus for dynamic electromagnetic focusing, according to an embodiment;

FIG. 5A is a block diagram that illustrates in plan view an example microfluidic electromagnetic measurement apparatus, according to an embodiment;

FIG. 7D is a graph that illustrates example core width variability based on alternative flow driving mechanisms, according to various embodiments;

FIG. 10 and is a graph of simulated data of the impedance spectrum of a mixed population of activated and resting platelets, according to an embodiment;

FIGS. 11A through 11F are graphs of simulated histogram data of the impedance at various frequencies for platelet populations activated to various degree with adenosine diphosphate (ADP), according to an embodiment;

DETAILED DESCRIPTION

Figure 2A:
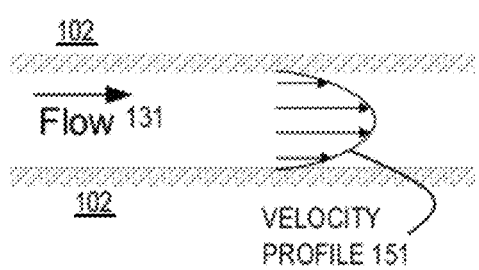
FIG. 2A and FIG. 2B are flow profile diagrams that illustrate effect of channel width on shear, according to an embodiment.

A method and apparatus are described for enhanced microfluidic electrical measurements. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of impedance measurements of platelets in a high dielectric fluid in microfluidic channels of a particular range of sizes. However, the invention is not limited to this context. In other embodiments the same or different electrical properties of the same or different particles are measured in microfluidic channels of the same or different sizes. The proposed methods bring a substantial gain in sensitivity over traditional microfluidic approaches, while minimizing the drawbacks of small channel size (high shear stress on cells, channel clogging). These improvements pave the way for the characterization of very small particles (<1 micron, 1 micron=$10^{-6}$ meters), and particles that are sensitive to shear stress (e.g., platelets).

A microfluidic channel, also called a microchannel herein, is a channel for fluid flow with a width and height each less than 1000 microns (also called micrometers, μm). Fluid flows in microfluidic channels are usually laminar rather than turbulent and have comparatively low Reynolds number values (<1), both situations resulting from the microchannel dimensions, the flow rates, and the fluid properties.

A used herein, a particle is any single object in motion within a fluid flow, which is small enough to fit within a microfluidic channel and large enough to affect an electromagnetic measurement of a fluid property within the channel. Particles include cells (including bacteria) and portions thereof, including platelets, as well as dust, pollen and other organic and inorganic materials.

1. Overview

In this section, an overview of the methods and apparati are given. More detailed embodiments are described in other sections. Electrical impedance, represented by the symbol Z, is a well known measure of opposition to alternating current (AC) and combines the effects of electrical resistance for direct current (DC) and phase shifts for (AC). Some detailed embodiments are described for electric impedance measurements of platelets, including a description of a prototype apparatus for measuring the electric impedance of platelets. Each reference cited herein is hereby incorporated by reference as if fully set forth herein, except so far as the terminology is inconsistent with the terminology used herein.

FIGS. 1A-1C are diagrams that illustrate a microfluidic flow cytometer, according to an embodiment. FIG. 1A shows a perspective cutaway view of a microfluidic channel 110 (also called microchannel herein) formed between two side walls 102, a top wall 104, and a bottom wall 106. For some electromagnetic measurements, such as impedance, one or more electrodes 120 are included on one or both opposite walls, e.g., a top wall and bottom wall in FIG. 1A. FIG. 1B shows a cross section across the width of the channel. FIG. 1C shows a cross section along a portion of the length of the channel. Impedance measured between the pair of electrodes is related to the total impedance of the particle 132 and the fluid media 130 between the electrodes 120. An impedance model 140 for a cell is depicted, with different contributions from cell wall and cell body represented by different boxes that represent different parameters of the model. Values for one or more parameters are estimated based on the impedance measurements at one or more alternating current (AC) frequencies.

To first order, the magnitude of an electromagnetic signal associated with the passage of a particle (including electrical impedance and optical interaction) is related to the size of the particle relative to the size of the channel in which the particle is flowing. If the particle blocks most of the channel when it is between the sensors (such as electrodes), the signal due to the passing particle is comparatively larger, and the property can be measured with higher resolution. If the particle is small compared to the channel, then the signal is comparatively weaker, reducing the resolution. This means that, for small particles, the channel is preferably small in order to produce a detectable change in signal. A further disadvantage of large channels is that such large channels can increase the probability of having more than one particle (co-occurrence) in the detection region of the sensor, e.g., between the detection electrodes, which could compromise the detection.

Figure 2B:
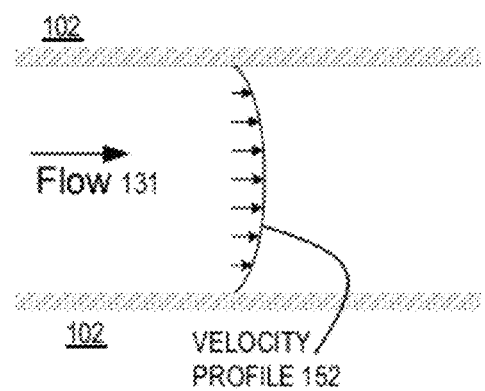

Unfortunately, small microfluidic channels (widths or heights <20 µm) imply large shear forces (e.g., compared to shear forces in the venous portions of an uncompromised circulatory system) across particles due to the typical parabolic flow profile in pressure-driven flows. FIG. 2A and FIG. 2B are flow profile diagrams that illustrate the effect of channel width on shear, according to an embodiment. Flow direction 131 is as depicted. Flow profile shows velocity profiles 151, 152, respectively, as a function of distance from a boundary, such as a channel wall 102. Velocity is given by the length of an arrow touching the parabolic curve. When width is small as in FIG. 2A, shear, a measure in this context of gradients perpendicular to a wall in velocity, is great. The same rate of flow through a wider channel, as in FIG. 2B, produces much smaller shears.

Small channels also are very prone to occlusion when dealing with samples having significant particle content (e.g., blood). In particular, for specific applications where shear rates have to be minimized (e.g., blood platelets, which are activated by shear), optimization of the channel size for signal strength (small channel) conflicts with the desire for a large channel to minimize shear values.

To circumvent these limitations, several embodiments use dielectric-based hydrodynamic focusing in order to allow the use of a large physical channel (hence reduced shear rates), with the simultaneous advantage of a small electrically conductive channel that carries the particles. While conductivity is the primary parameter defining the field and current path through a structure at direct current (DC) and low alternating current (AC) frequencies, the dielectric constant and related permittivity are the dominant factors at high AC frequencies. The exact frequency at which dielectric properties start to dominate over conductivity properties is dependent on a number of factors (e.g., actual electrical parameters of the materials and structure, geometry, parasitic capacitance/resistance, etc.), but only an appropriate control of the dielectric/permittivity characteristics of the channel would allow the contrast between the physical channel and the electrically conductive channel to be maintained over an extended frequency range.

The dielectric constant is a dimensionless ratio of the permittivity of a substance to the permittivity of free space. It is an expression of the extent to which a material concentrates electric flux. Permittivity is determined by the ability of a material to polarize in response to the electric field, and thereby reduce the total electric field inside the material. Thus, permittivity relates to a material's ability to transmit (or "permit") an electric field (in particular an alternating electric field); and is dependent on a number of factors, including AC frequency. Thus, the electric field between two plates passes preferentially through a material with high permittivity (large dielectric constant) and around a material with low permittivity (small dielectric constant). For example, for impedance measurements, the particles are included in a core fluid with relative large dielectric constant and kept apart from the walls of the channel by a different fluid with a relatively small dielectric constant. The different fluid forms a sheath around the core fluid and is called hereinafter the sheath fluid. Therefore the electric field between the electrodes in opposite walls of the channel passes predominantly through the core fluid rather than the sheath fluids. In other embodiments, the sheath fluid has different values of other electromagnetic properties, such as different values for an index of optical refraction. As used herein the core fluid refers to the material flowing in a core flow, and the core, or core flow, refers to the spatial distribution of the core fluid, having such properties as position, width, height, flow rate (mass per unit time) and velocity.

This concept is illustrated in FIG. 3A and FIG. 3B, which are diagrams that illustrate an apparatus for dynamic electromagnetic focusing, according to an embodiment. FIG. 3A depicts a plan view of a central channel 310 and two side channels 312. The target of the electromagnetic measurements is one or more particles in a core fluid introduced into the central channel at the sample inlet 320. The sheath fluid with the different value of an electromagnetic property, e.g., a much lower dielectric constant, is introduced at the sheath flow inlets. The fluids merge at a junction 314; and the core fluid is confined to a core flow in a central portion of the channel downstream of the junction, well away from the channel walls, and, thus, in a portion of the flow profile where shear is near zero. The sensor for the electromagnetic measurements, such as a set of electrodes 120 on top and bottom walls, is also downstream of the junction 314. The flows leave the device at outlet 316.

The effect of a low dielectric sheath fluid in the cross section at the sensor is depicted in FIG. 3B, where the sheath fluid is light gray, and the core fluid is darker gray, and a particle 132 of size comparable to the width of the core fluid is shown as a white oval. Electric field lines 330 between electrodes 120 are depicted as downward pointing arrows, with flux decreasing as spacing between arrows increases. The electric field flux is predominately through the core fluid and the particle. The cross-section emphasizes the localization of the sensing current in the core (as symbolized by arrow density) due to the dielectric constant (and thus conductivity) contrast between the core and the sheath.

For core and sheath flow of similar viscosities, the flow profile across the channel will be similar to the classic parabolic flow of a large channel. Particles or cells traveling in the core are thus subjected to little shear. However, since the core is more conductive, the sensing current for the impedance measurement is confined to the core, mimicking an electrically conductive channel of the width of the core.

In the illustrated embodiment, it is very advantageous to use a sheath fluid with a very low dielectric constant (e.g., fluorocarbon solvent or mineral oil), which provides electromagnetic focusing over a much larger range of AC frequencies than a water-based sheath most often described in the literature. For instance, a perfluorocarbon sheath (3M Fluorinert™ FC Series, $\in_r=1.9$, $\rho>10^{15}$ $\Omega \cdot cm$, where $\in_r$ is dimensionless relative permittivity and $\rho$ is linear DC resistance in ohm centimeters, $\Omega \cdot cm$, and 1 cm=$10^{-2}$ meters) in a 50×50 µm channel (50 microns wide and 50 microns high) with a 10 µm wide core and 10 µm long electrodes, extends the usable AC frequency range for impedance from 70 megahertz (MHz, 1 MHz=$10^6$ Hertz, 1 Hz=1 cycle per second) for a deionized water sheath ($\in_r=80$, $\rho \sim 10^{18}$ $\Omega \cdot cm$) to more than 360 MHz for the perfluorocarbon sheath.

In addition, the use of a low dielectric constant liquid immiscible in water (e.g., fluorocarbon solvents or oils such as mineral oil) for the sheath fluid provides an abrupt boundary at the sheath/core interface, as opposed to aqueous-based sheaths, which are subject to diffusion and 'blurring' of the interface. Such immiscible liquids comprise predominately non-polar molecules and are said to be hydrophobic. Sheath fluids of different molecular polarity from the core fluid (called two-phase flows herein) thus offer the advantage of a sharp boundary and further offer the advantage of producing small fluid core widths (<10 µm) most useful to measure small particles (<1-5 µm) such as platelets.

A disadvantage of two-phase flows is difficulty found in maintaining a stable flow boundary. An unstable flow boundary leads to variability in the width of the core and variability in the electromagnetic measurement that is not related to the passage of particles. In various embodiments described in more detail below, adjustments to the apparatus or methods or both are made to decrease the disadvantageous effects of unstable core width in two-phase flows.

While this hydrodynamic focusing is only along one dimension in the illustrated embodiment, it is enough to reduce the cross-section of the sensing volume to a size comparable to the size of the particle to be sensed. The vertical dimension is not critical with this approach, and can be kept large, thus reducing shear rates in the vertical direction.

In some embodiments the particles or core fluid or both are actively centered in the channel (in the region of lowest shear) using well-known methods such as dielectrophoresis. Such active centering further reduces the variability of the measurements and the shear rates to which the particles are subjected.

Another benefit of electromagnetic property focusing is the possibility of achieving the narrow fluid cores (required for high resolution) in wide channels produced by low-cost techniques, such as laser-cut channels in pressure-sensitive adhesive. These less stringent requirements with respect to channel geometry mean simpler, cheaper fabrication methods can provide measurement resolution comparable to conventional but expensive, lithographically-defined microchannels.

Figure 4A:
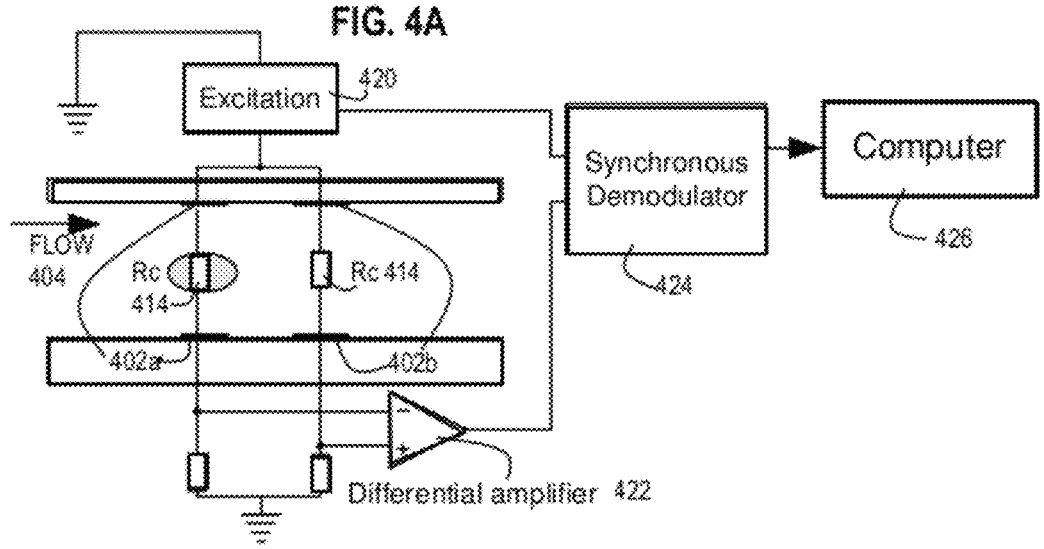
FIG. 4A and FIG. 4B are diagrams that illustrate electromagnetic measurement apparatus and data, according to an embodiment.
Figure 4B:
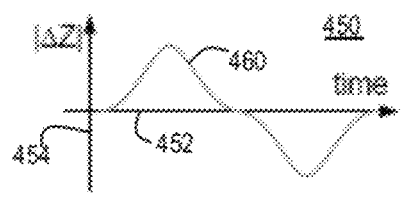

Any method can be used to make the electromagnetic measurements. For example, in a simple embodiment the electrical impedance is measured as depicted in FIGS. 4A and 4B. FIG. 4A and FIG. 4B are diagrams that illustrate electromagnetic measurement apparatus and data, according to an embodiment. FIG. 4A depicts an example electrical measurement apparatus using two pairs of electrodes 402a, 402b. In this embodiment, particle spacing in the core fluid is controlled so that the typical distance between particles is greater than the distance between the two pairs of electrodes. Flow direction is represented by flow 404. Thus when the particle is in the detection region for the first pair of electrodes, no particle is in the detection region of the second pair. The impedance difference between the two pairs is dependent on the impedance of the particle Rp 412, and independent of the impedance of the channel, Rc 414.

The apparatus includes, besides the electrodes 402a, 402b and the channel carrying the fluids, an excitation module 420, a differential amplifier 422, a synchronous demodulator 424 and a computer 426. The AC frequency of the measurement is determined by the excitation module. Multiple frequencies are usually superimposed in the excitation signal from the excitation module. The current measured through the electrodes on opposite walls is inversely proportional to the impedance. The current difference is amplified by the differential amplifier and AC phase determined in the synchronous demodulator. The measurements are sent to a computer, such as general purpose computer depicted in FIG. 13 or chip set depicted in FIG. 14, where program instructions are used to derive the impedance of the cell based on the electrical current phase and amplitude differences at the two pairs of electrodes. By using two pairs of electrodes, a differential measurement is performed, reducing the sensitivity to common-mode noise. FIG. 4B is graph 450, with time on horizontal axis 452 and impedance change on vertical axis 454. The impedance data are graphed in FIG. 4B as trace 460 showing one impedance change as the particle first passes the first pair of electrodes and then the opposite effect when the particle passes the second pair of electrodes. In some embodiments, multiple AC frequencies are summed at the excitation module to measure impedance at multiple frequencies simultaneously on the same electrode pairs.

In some embodiments, enabled by micro-fabrication techniques, impedance measurements at multiple AC frequencies rely on the use of multiple sets of electrodes along the channel, each set including one or more pairs of electrodes and measuring the same particle as it flows through the set. Such embodiments provide independent measurements of the impedance at each set, allowing averaging or other statistical approaches to be used for increasing the signal-to-noise ratio (SNR). For instance, if the particle is measured by four sets of independent electrodes, then the averaging of these four measurements increases the SNR by two. In some embodiments, using multiple measurements along the channel also averages out the impedance variation due to possible rotation of a non-spherical particle within the core. Using other sets of electrodes as reference also allows adaptive signal processing to be used, such as for noise removal, in some embodiments. Furthermore, in some embodiments, the various sets of electrodes are used to probe different frequencies. Such sequential measurements of the same particle along the channel are not obviously available in typical aqueous flows, due to the rapid diffusion and degradation of the core profile. Such sequential measurements are much more feasible with two-phase flows, which conserve a well-defined core over long distance even at low flow rates.

The microfluidic flow cytometer can be coupled to other fluidic functions, such as cell sorting or inline chemical activation/treatment of cells prior to or after these electromagnetic measurements.

As described above, with more details to follow below, dielectric focusing provides many advantages. When combined with impedance spectroscopy, these techniques provide increased signal-to-noise ratio over an extended frequency range (>100 MHz). Low-shear-rate flow cytometry apparatus can still be used to obtain high impedance resolution. Two-phase (polar/non-polar) flow further improves dielectric focusing by limiting diffusion and allowing the use of ultra-low-dielectric-coefficient liquids (e.g., fluorocarbon solvents and mineral oil). High-resolution impedance spectroscopy is therefore possible in even wider, simpler-to-fabricate channels.

In an example embodiment, impedance spectroscopy of platelets is demonstrated in a microfluidic flow cytometer for the evaluation of platelet activation levels without disturbing platelet activation state by high shear flows. In some embodiments, the use of air sheath or hydrophilic tracks in an otherwise-hydrophobic channel is shown to confine the aqueous core, thus providing flow with minimal shear rate at the air-water interface, yet with increased electrical confinement. Precise and stable core width is achieved in some embodiments through closed-loop control of sheath and core flows based on continuous impedance measurement. In some embodiments inner wall surface features, such as rails, are effectively employed to stabilize two-phase flows. Such stabilization can be applied to both aqueous flows and two-phase flows, and could also be used in some embodiments as a calibration step rather than for real-time control. Sequential measurements of the same particle along the channel using multiple independent sets of electrodes allows separation of AC frequencies or application of signal processing technique to increase information content (e.g., higher SNR through averaging, adaptive filtering). Particles with known electromagnetic properties are also used in some embodiments to track the actual variability of the core flow.

Use of low-dielectric sheath fluid (with low refractive index) is also useful to guide light for optical interrogation of particles. The low-refractive-index sheath with the higher-refractive-index core provides in effect an optical waveguide to focus the light beam onto the particles in the core. The shape of the core can be assessed by measurement of total internal reflection. In various embodiments, such optical measurements with index of refraction focusing are correlated with simultaneously-acquired electrical (e.g., impedance) measurements, with or without dielectric focusing. In various embodiments, optical measurements that do not rely on total internal reflection are used as well as or instead of optical measurements that do rely on total internal reflection, with or without electrical measurements, or with or without dielectric focusing.

2. Example Apparatus Embodiments

FIG. 5A is a block diagram that illustrates an example microfluidic electromagnetic measurement apparatus 500, according to an embodiment. The apparatus 500 includes microchannels 502 through which a sample input port 504 is connected to a central microchannel that joins two sheath microchannels each fed by a sheath fluid input port 506a, 506b. The microchannels from each input port meet at a junction which connects to an exit port 508 through a portion of the central microchannel. In some embodiments, additional sample or sheath microchannels are included.

The sample to be analyzed is introduced at the sample input port 504, and flows along the central microchannel 502 to the junction. One or more sheath fluids are introduced at the sheath fluid input ports 506a, 506b and flows along the side microchannels 502 to the junction. Downstream of the junction the sample fluid forms a core flow between the sheath fluid flows and all fluids exit at the exit port 508.

The apparatus further comprises one or more pressure actuators (such as pressure controllers or pressure regulators) to apply fluid pressure at one or more input or exit ports. For example, in the illustrated embodiment, apparatus 500 includes a sample pressure actuator 514 that acts at sample input port 504, and two sheath fluid pressure actuators 516a, 516b that act at sheath input ports 506a, 506b, respectively. Any method may be used to apply pressure at the various input ports, for example a servo motor controlling a syringe can be used, compressed air exerting a pneumatic pressure on the sample and sheath fluid in a reservoir, hydrostatic pressure due to a fluid reservoir at fixed elevation above the main apparatus, or a diaphragm controlled by hydraulics. In an experimental embodiment, these pressures are applied to the sample and sheath inlets, with the outlet remaining at atmospheric pressure. In various embodiments the same or different pressure is applied at each input port. In some embodiments, some or all of the actuators are on the chip with the microchannels. In other embodiments, the actuators are external to the chip that includes the microchannels. In some embodiments, one or more pressure actuators 514, 516a, 516b are omitted.

The apparatus 500 includes a processor/controller 520, such as a microprocessor or general purpose computer with zero or more application specific integrated circuits (ASICs) programmed to control various components of the apparatus. In some embodiments, the processor/controller 520 controls the pressure actuators 514, 516a and 516b. In some embodiments some or all of the processor/controller is on the chip with the microchannels. In other embodiments, the entire processor/controller is external to the chip that includes the microchannels. In an experimental embodiment, pressures was either generated by stand-alone syringe pumps (Cole-Parmer), manually set to a fixed flow rate, height (hydrostatic pressure from manually raised sample and sheath fluid reservoir), or pneumatically (compressed air), in which case the pressure was regulated by a combination of pressure sensor and proportional pneumatic valve in a closed-loop system (microcontroller).

The apparatus 500 includes one or more sample conditioning components 530 to condition the sample fluid before it becomes the core fluid downstream of the junction. For example, reservoirs of one or more reagents are included in conditioning components 530, such as reagents that stimulate activation of platelets. In some embodiments, chemical or mechanical filters, mixers or buffers are included in the sample conditioning components 530, such as mechanical filters for separating platelets from red blood cells. In some embodiments, the sample conditioning components include a source of known particles 540 that are used to determine or correct for variability in core width, or both, as described in more detail in a later section. In an experimental embodiment, sample preparation (dilution, reagent mixing, addition of calibration particles) was performed manually in separate containers, then connected to the apparatus 500 for analysis.] In some embodiments some or all of the sample conditioning components 530 are on the chip with the microchannels. In other embodiments, all the sample conditioning components 530 are external to the chip that includes the microchannels. In some embodiments, the sample conditioning components 530 are omitted; and, any known particles 540 are included in the sample fluid at the input port 504. In some embodiments, the sample conditioning components 530 are controlled, in whole or in part, by the processor/controller 520.

The apparatus 500 includes one or more centering components to center particles in the sample fluid in the core flow. For example, in the illustrated embodiment, the apparatus 500 includes dielectrophoresis components 550, e.g., to drive particles toward the center of the core flow. In some embodiments the centering components, such as dielectrophoresis components 550, are omitted. In some embodiments, the centering components, such as dielectrophoresis components 550 are controlled, in whole or in part, by the processor/controller 520.

The apparatus includes one or more core fluid sensors 560, such as electrodes, as described above, or optical sensors. The core fluid sensors 560 produce or detect, or both, electromagnetic signals that, owing to the preferential passage of the electromagnetic signals through the core (e.g., by dielectric focusing), are more sensitive to perturbations that occur in the core fluid, such as the passage of a particle. In some embodiments, the core fluid sensors 560 are monitored or controlled, in whole or in part, by the processor/controller 520.

Figure 5B:
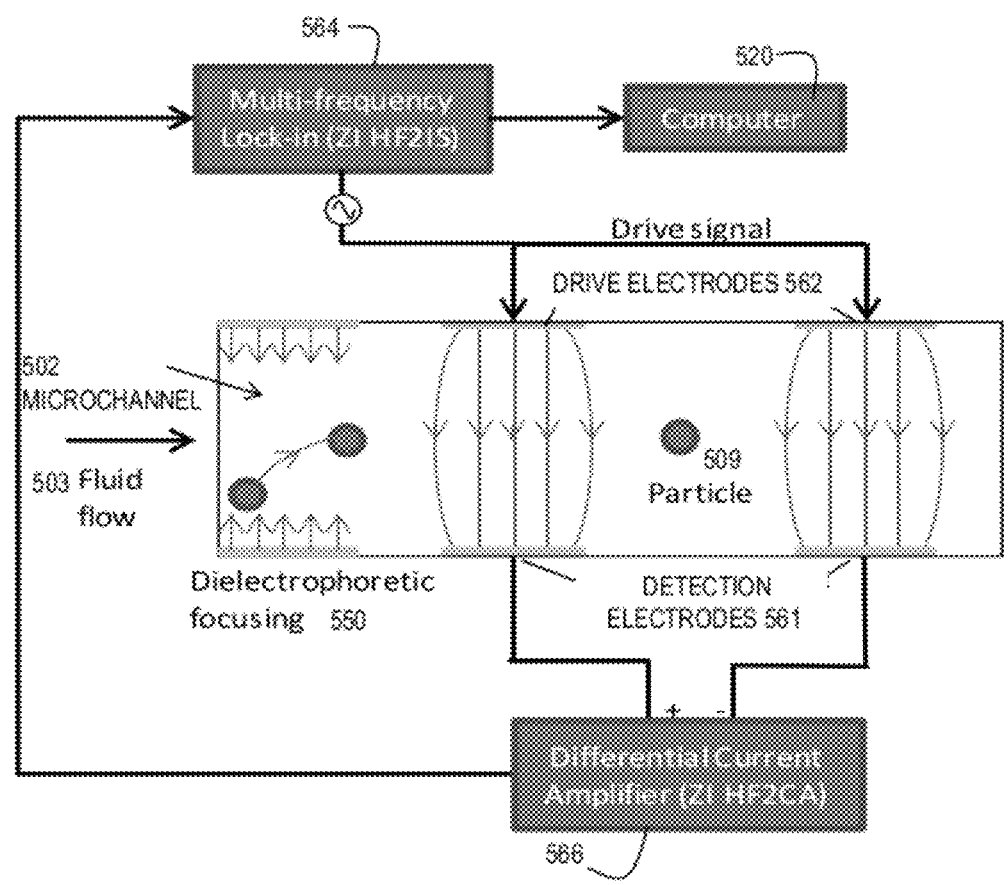
FIG. 5B is a block diagram that illustrates in partial cross-section view an example microfluidic impedance measurement apparatus, according to an embodiment.

FIG. 5B is a block diagram that illustrates in partial cross-section view an example microfluidic impedance measurement apparatus, according to an embodiment. In this embodiment, a custom impedance spectroscopy system is composed of a lock-in detector (SR830 DSP, Stanford Research Systems, Sunnyvale, Calif.) 564, a custom differential current-voltage converter 566, and a computer-controlled acquisition system 520. This system gave satisfactory results; however, it was limited in frequency to 100 kHz. For measurements at higher frequencies, a multi-frequency impedance spectroscopy system from Zürich Instruments was used, and greatly improved measurement capabilities in other embodiments. This system was capable of simultaneously measuring six frequencies up to 50 MHz (10 MHz effectively once parasitic capacitance of various chip components was taken into account). All platelet characterizations, described in a later section, were carried out using this system. Typical excitation voltages were kept under 1 Volt (V) per excitation frequency to avoid heating of the sample. Sampling speed was 7.8 kHz in order to fully capture the transient impedance change.

2.1 Multiple Sets of Detection Electrodes

FIG. 5C through FIG. 5G are diagrams that illustrate an apparatus 570 for dynamic electromagnetic focusing and multiple electromagnetic measurements, according to another embodiment. The example microfluidic impedance cytometer uses a fluidic layer fabricated from 50-μm-thick, double-sided adhesive film (Adhesives Research, Glen Rock, Pa.) using a $CO_2$ laser engraving and cutting system (Universal Laser Systems, Scottsdale, Ariz.). The device 570 includes sample inlet 571 and two sheath inlets 572a, 572b and focusing electrodes 573 and outlet 578. Three sets of electrodes 574 (for single or repeated measurements), each comprising two pairs of 20-∥m-wide platinum electrodes, separated by 100 μm, patterned on Borofloat® glass using standard photolithography and sputtering, were used for differential measurements. The fluidic layer was sandwiched between two glass chips 582 (see FIG. 5D) and bonded using a hot plate at 70° C. and a hand roller. Fluidic connections were fabricated from polydimethylsiloxane (PDMS) and bonded to the top glass chip with the aid of air plasma that was used to chemically activate the surface to improve adhesion.

Figure 5C:
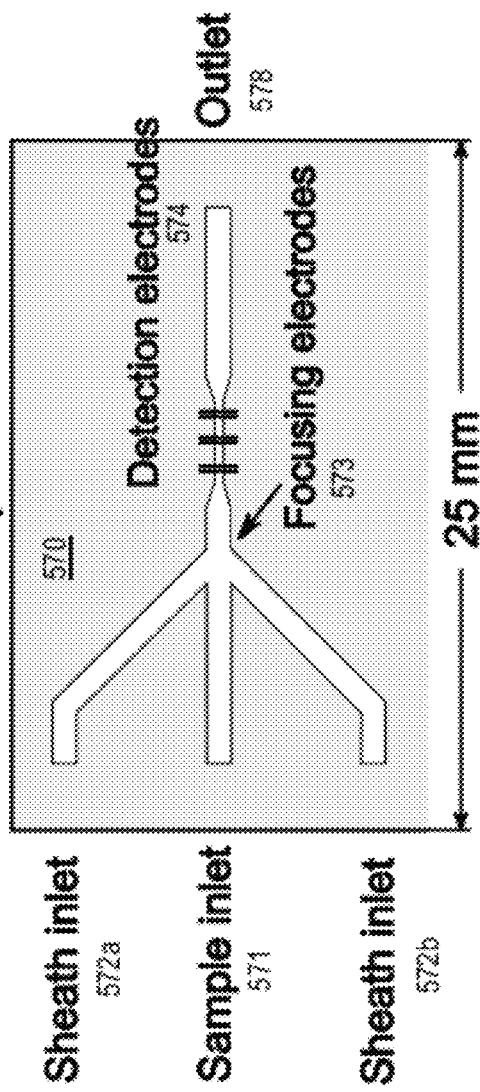
FIG. 5C through FIG. 5G are diagrams that illustrate an apparatus for dynamic electromagnetic focusing and multiple electromagnetic measurements, according to another embodiment.

FIG. 5C shows a plan view of the channel layer with two sheath inlet channels 572a, 572b flanking a central sample inlet channel 571 that meet at a common junction beyond which is a common channel ending in an outlet 578. The inlet channels are about 10-millimeter long (mm, $1 \text{ mm}=10^{-3}$ meters), as is the common channel. In the common channel downstream of the junction are focusing electrodes 573 that cause the particles to flow near or at the center of the common channel using dielectrophoresis. Farther downstream are three sets of detection electrodes 574, each set comprising two pair of electrodes for comparative measurements of each particle. The common channel narrows appreciably in the vicinity of the detection electrodes from 1000 μm to 350 μm in order to facilitate the focusing of narrow cores.

Figure 5D:
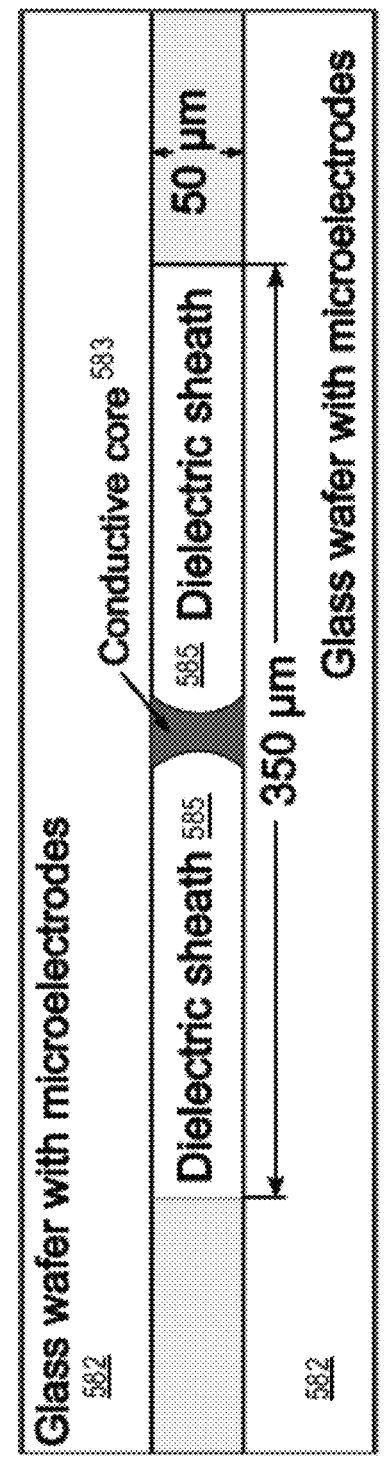

FIG. 5D shows a cross sectional view in a plane perpendicular the long dimension of the channel. The channel is 50 μm high, 350 μm wide with a high conductive and high dielectric constant core fluid 583 occupying a core flow only about 20 μm wide at the center of the channel and flanked by dielectric sheath fluids 585. The top and bottom walls are glass wafers 582 upon which one or more of the electrodes are supported.

Figure 5E:
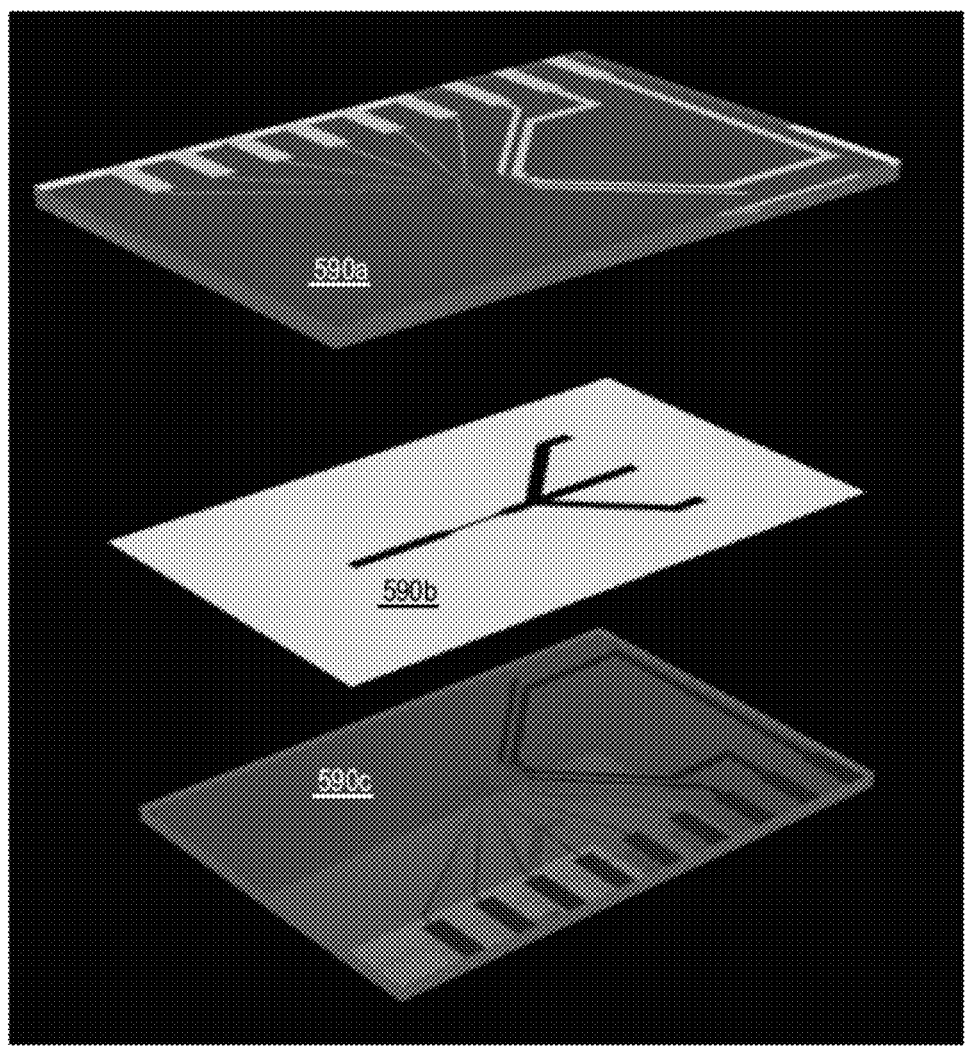
Figure 5F:
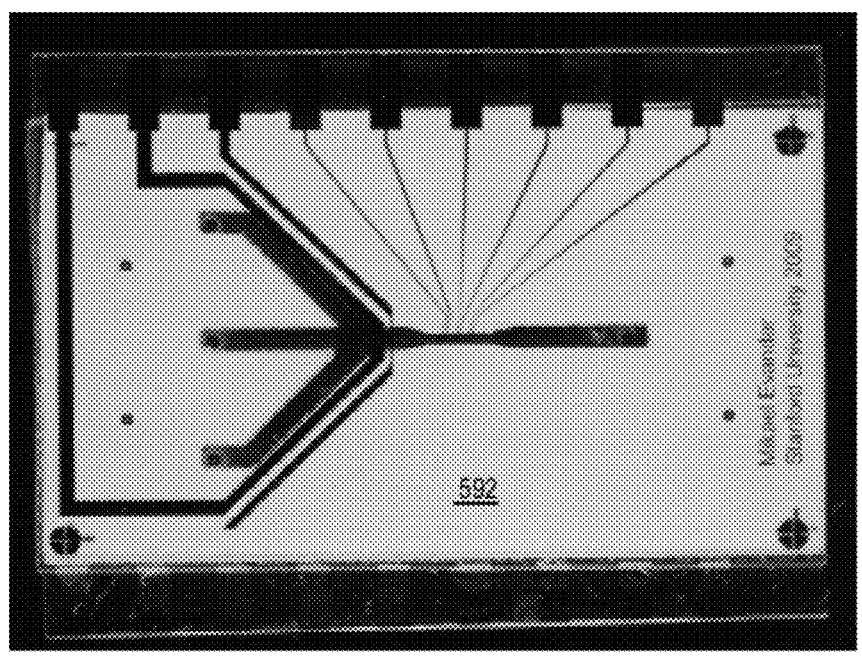
Figure 5G:
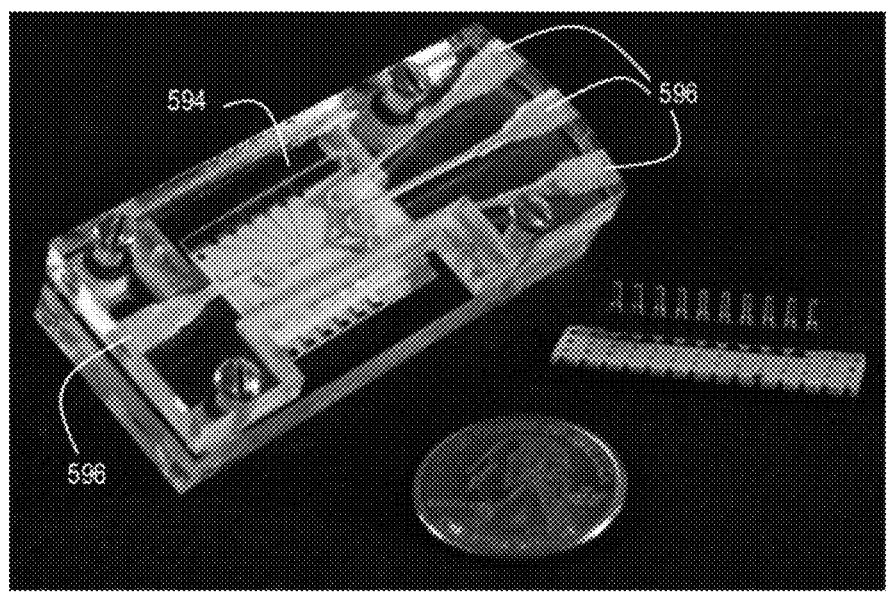

FIG. 5E depicts three dimensional (3D) computed aided design (CAD) drawings of the microfluidic chip exploded by layers 590a, 590b, 590c. FIG. 5F is a photograph of bonded chip 592. FIG. 5G is a photograph of a complete example microfluidic cartridge 594 with ports 596 for fluidic connections and electrical contacts.

2.2 Channels for Two-Phase Flows

In some embodiments, as described above, two-phase flows are used. For example, in some embodiments an aqueous core fluid (polar water molecules) is used with sheath fluids comprising non-polar molecules. FIG. 6D and FIG. 6E are micrographs that illustrate core flow in the presence of example rails and electrodes, respectively, according to an embodiment. FIG. 6E shows an example of such a flow, with a plan view of electrodes 678 and a core fluid 680 flowing between immiscible sheath fluids 684. A 100 micron scale bar 694 is depicted. However, achieving stable, reproducible two-phase flows in microchannels has been notoriously difficult, and most of the solutions found in literature require the use of high-viscosity oils as sheath fluid, generating large shear at the interface core/sheath. In order to allow the use of less viscous fluid (such as fluorocarbon solvents with very low dielectric constants), a method based on work by Zhao, Moore and Beebe (Analytical Chemistry, Vol. 74, No. 16, Aug. 15, 2002) using surface energy patterning is used in some embodiments, as depicted in FIG. 6A.

Figure 6A:
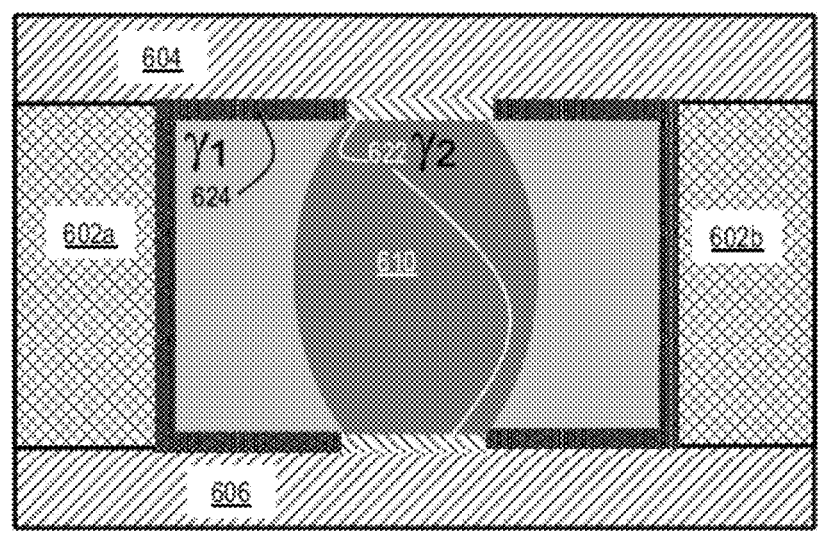
FIG. 6A is a diagram that illustrates channel engineering to stabilize two-phase flows, according to an embodiment.

FIG. 6A is a diagram that illustrates channel engineering to stabilize two-phase flows, according to an embodiment. In channel formed by side walls 602a, 602b, top wall 604 and bottom wall 606, an aqueous core fluid 610 is guided by high-surface-energy (hydrophilic, $\gamma_2$) tracks 622 in a low-surface-energy (hydrophobic $\gamma_1$) coated 624 channel. In some embodiments, these tracks are patterned by prior hydrodynamic focusing with fluids containing surface modification chemicals, resulting in a self-aligned process. In some embodiments, the sheath fluid is simply air (or another gas), simplifying the fluidics and reducing shear rates at the core/sheath interface. It is believed that the application of such a gas as a sheath fluid to provide reduced shear rates has not been suggested yet.

For example, in some embodiments, the channel surface modification are self-aligned using hydrodynamically-focused laminar flows containing hydrophobic (non-polar) molecules in a sheath flow and hydrophilic molecules in a core flow. These molecules are selected so that they attach to the surface as they flow through the channel. Once the surface has been modified, the channel is flushed and the fluids and particles of interest for measurement are introduced into the device. The hydrophilic 'lane' then stabilizes and guides the aqueous core in its desired path along the center of the channel. The guiding effect provided by the patterned surface energies can also be augmented by topographical cues (slight height difference between the high and low surface energy coatings). Including such surface patterning provides a geometrically stable and spatially reproducible core.

Experiments were performed using this surface chemistry approach. In some embodiments, standard silane chemistries (combinations of fluorosilanes and aminosilanes), as well as Bovine Serum Albumin (BSA) or Pluronic F68 (an amphiphilic copolymer from BASF, Ludwigshafen, Germany) adsorption were used. In some embodiments, a microstamping method was used as a way to define the hydrophobic/hydrophilic track.

Figure 6B:
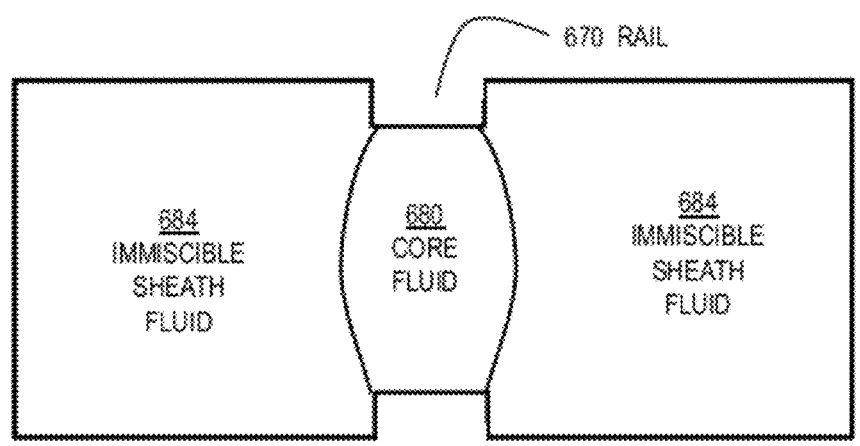
FIG. 6B and FIG. 6C are block diagrams that illustrates example channel cross sections for a microfluidic electromagnetic measurement apparatus, according to various embodiments.
Figure 6C:
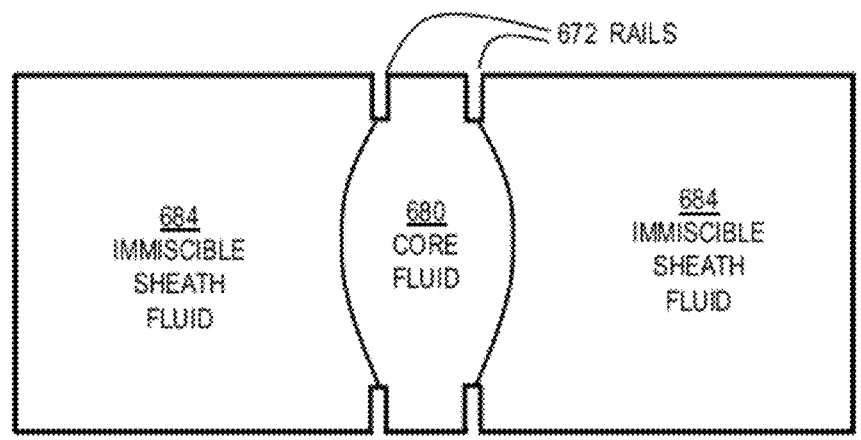
Figure 6D:
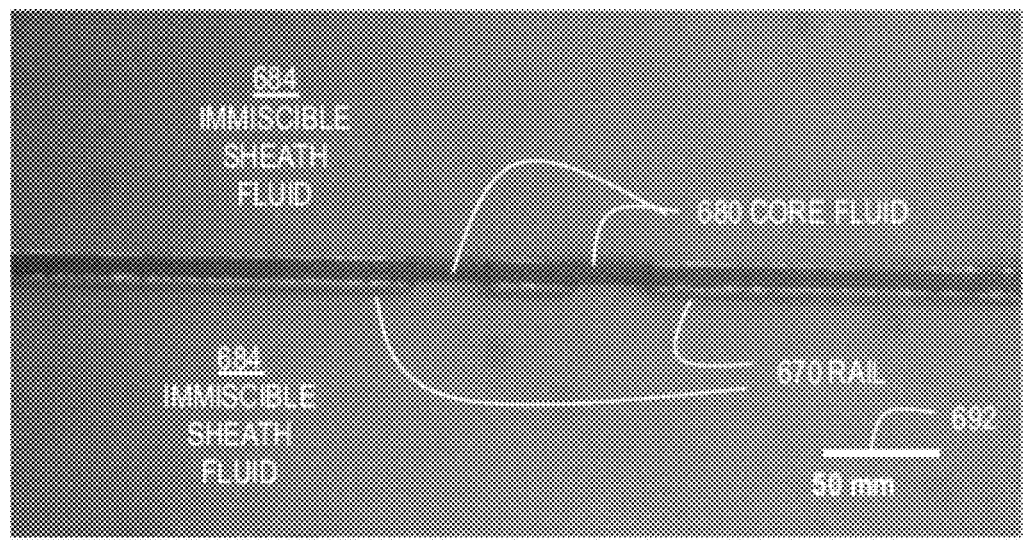
FIG. 6D and FIG. 6E are micrographs that illustrate core flow in the presence of example rails and electrodes, respectively, according to an embodiment.
Figure 6E:
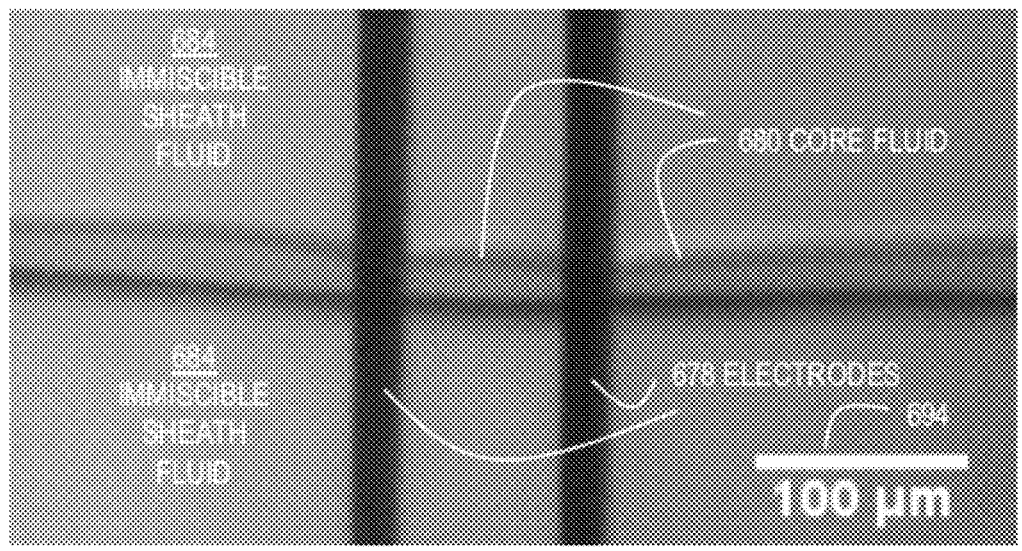

In some embodiments, topographical cues were used, alone or in combination with surface chemistry. FIG. 6B and FIG. 6C are block diagrams that illustrates example channel cross sections for a microfluidic electromagnetic measurement apparatus, according to various embodiment. FIG. 6B shows a single rail 670 surface topography on both top and bottom walls. In this embodiment, a boundary between a core fluid 680 and each immiscible sheath fluid 684 is expected to follow an edge of the single rail 670. FIG. 6C shows multiple rail 672 surface topography. In this embodiment, a boundary between a core fluid 680 and each immiscible sheath fluid 684 is expected to follow an edge of one rail of the multiple rails 672. For example, tracks and ridges were defined in photoresist or SU-8 along the channel to physically guide the core. These methods were successful in bare channels. Thus rails were observed to provide an advantage in stabilizing two-phase flows. In some embodiments, the rails are added to only one of the top and bottom walls. FIG. 6D shows a plan view of a example rail 670 and a core fluid 680 flowing between immiscible sheath fluids 684, according to an embodiment. A 50 micron scale bar 692 is depicted.

However, the addition of electrodes on the surface noticeably disrupted the flow. Ultimately, a combination of topographical and surface modification is anticipated to achieve a reliable, stable two-phase flow at those dimensions and flow rates.

2.3 Dynamic Modulation of Core Width

In some embodiments, the width of the core is modulated to some extent dynamically by varying the differential pressure between the core and the sheath. In some embodiments, this principle is used to provide a variable width of the flow of the core fluid (called the core flow hereinafter). Such embodiments allow rapid reconfiguration of core flow width for optimally sensing particles of different sizes, all with the benefits of low shear and high resolution. In some embodiments, the impedance of the core, as measured by the detection electrodes, is used to estimate its width. For example, the impedance of the core absent a particle, or the average minimum impedance over a time interval during which one or more particles have passed, is used to determine width. In some embodiments, a width calibration curve is generated through experiment. In other embodiments other properties are measured, such as the optical measurements of core properties described in the next section.

In some of these embodiments, the measurements, such as the impedance or optical measurements are used to control the flows (such as by controlling the pressure) in a feedback loop to set precisely the core to a pre-determined width. For example, by maintaining or adjusting the pressure to stabilize an optical or impedance measurement at a predetermined value associated with the desired width. In various embodiments, such control is implemented in a separate calibration step, or is accomplished in real time (e.g., determining an average minimum value for a time interval).

In some embodiments, the width of the core flow is calibrated based on the measured impedance of the known particles 540 depicted in FIG. 5A, such as mono-disperse polystyrene beads. Such beads, of calibrated diameters, generate a control signal that can be used to estimate core properties, or normalize the signal (as described in more detail below). This normalization accounts for varying flow rate, core flow width due to boundary instability between oil sheath and core fluid, and core fluid conductivity differences of different samples.

Figure 7A:
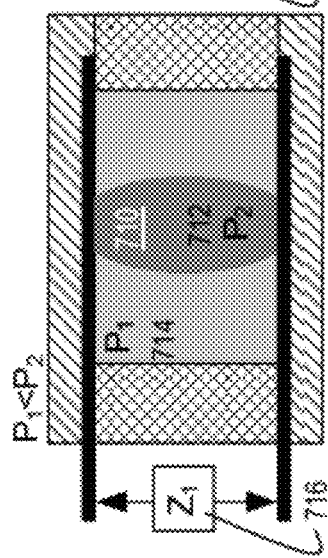
FIGS. 7A through 7C are diagrams that illustrate core modulation controlled by a flow rates or pressures or both; according to various embodiments.
Figure 7B:
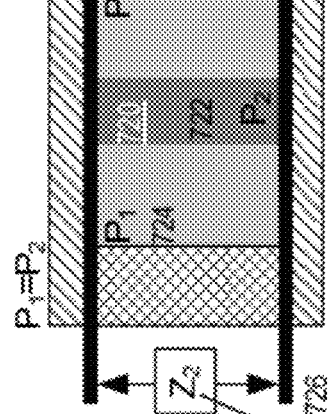
Figure 7C:
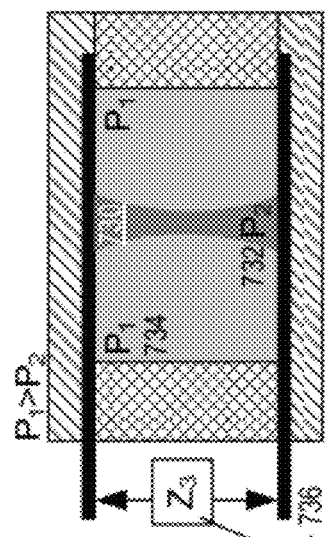

FIGS. 7A through 7C are diagrams that illustrate core modulation controlled by flow rates or pressures or both; according to various embodiments. FIG. 7A shows a wide core flow 710 caused by a positive core pressure 712 (P2) greater than sheath flow pressure 714 (P1), and an associated impedance value 716 Z1 absent a particle (e.g., at a minimum measured impedance). FIG. 7B shows a moderate width core flow 720 caused by a small relative pressure of core pressure 722 (P2) about equal to sheath flow pressure 724 (P1), and an associated impedance value Z2 726 absent a particle. FIG. 7C shows a narrow core flow 730 caused by a negative relative pressure of core pressure 732 (P2) less than sheath flow pressure 734 (P1), and an associated impedance value 736 Z3 absent a particle. By decreasing the sheath flow pressure (P1) when the impedance absent a particle is between Z2 and Z3, and increasing the sheath flow pressure (P1) when the impedance absent a particle is between Z1 and Z2, the core width can be stabilized to that shown in FIG. 7B.

Because width is the narrowest dimension of the core flow, these embodiments amount to controlling a narrowest spatial dimension of the core fluid by controlling relative pressure of a source of the core fluid compared to pressure of a source of one or more of the sheath fluids. To stabilize the core width, some of these embodiments involve controlling the relative pressure to stabilize a measurement of a property of the core fluid, such as its impedance, its impedance absent a particle (e.g., average minimum impedance during a time interval) or optical measurements of width, alone or in some combination.

Experiments were performed that showed pressure-induced flow provided an advantage over pulsatile syringe-pump-induced flow used in some embodiments. As expected, flows generated with syringe pumps exhibited pulsatile behavior due to the stepping action of the motors that drive these pumps. Because of the differential nature of the measurement, the impact of these pulsations was strongly reduced. However, these pulsations were still contributing to some residual instabilities in the flow, and likely to some of the variability in the final data. To improve on this, pressure-controlled flows were implemented for the sheaths (the most sensitive to pulsation) in some embodiments. In one embodiment, hydrostatic pressure was generated by raising the fluid reservoir (gravity-flow) between 1 and 20 cm above the chip level (usually by filling a pipette to the desired height). In a second embodiment, a closed-loop system was used to provide constant fluid pressure. This system used a proportional pneumatic valve to pressurize the fluid reservoir with air. A pressure sensor in line with the fluid connection to the chip was sensing the fluid pressure, and feeding it to a closed-loop control system regulating the proportional valve. This system effectively regulated sheath inlet pressure with a fixed, selectable pressure.

This approach greatly reduced signal variation, and improved overall stability of the core. FIG. 7D is a graph 770 that illustrates example core width variability based on alternative flow driving mechanisms, according to various embodiments. The horizontal axis 772 is time in seconds (s); the vertical axis 774 is voltage proportional to deviations in width of the core flow. Traces are shown for syringe-driven flows that exhibit a large variability 782 in widths. In contrast, traces are shown for pressure-driven flows that have much lower variability 784 of widths. Based on these data, any non-pulsatile, constant-pressure fluidic system is advantageous for future implementation. In addition to simplifying sample handling, some implementations of such an approach have also the merit of being more easily integrated into a point of care (POC) system design.

2.4 Optical Measurements of Core Flow

The concept of electromagnetic property focusing can be used not only to focus electrical currents, but also, or alternatively, light beams. By using a core with a higher refractive index than the sheath (a condition readily obtained with an aqueous core and a fluorocarbon sheath), one can achieve the conditions for total internal reflection of light inside the core, depending on the angle of incidence of the light. This optimally focuses the light within the core, where it can be used to interrogate passing particles. Any optical measurement can be used in various embodiments, such as fluorescence, scattering, absorption, diffraction or other optical interactions, with or without total internal reflection, with or without impedance measurements, and with or without dielectric focusing.

Figure 8:
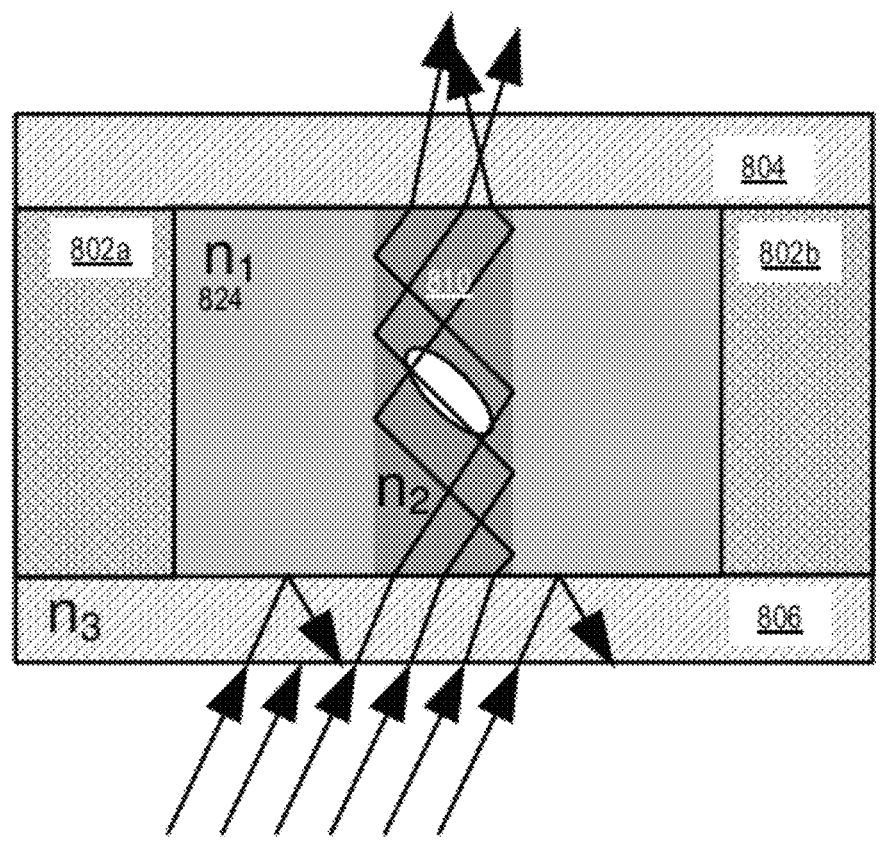
FIG. 8 is a diagram that illustrates optical confinement of light in core, according to an embodiment.

FIG. 8 is a diagram that illustrates optical confinement of light in the core, according to an embodiment. The index of refraction in the sheath fluid 824 is n1, in the core 810 is n2, and in the bottom wall 806 is n3. The core fluid has a higher refractive index than the sheath fluid ($n_2 > n_1$). With both n2 and n3 greater than n1 of the sheath, light is reflected away from the sheath fluid. With n2 and n3 similar in value, light easily enters the core which acts as wave guide, emitting most of the light into the top wall 804 with an index of refraction also close to that of the core fluid. Side walls 802a, 802b can have any index of refraction. Since refractive index is directly related to relative permittivity, the conditions for good electrical focusing (low dielectric sheath) are ideally suited for such optical confinement, allowing simultaneous optical and electrical interrogation.

Optical interrogation can then be coupled to electrical interrogation to provide enhanced information on the measured particles. In a similar application to that shown in FIGS. 7A through 7C, optical interrogation can also be used to evaluate the width of the core, since internal reflection will be modified by the angle of the core/sheath interfaces. In some embodiments, optical focusing in the core is used even without dielectric focusing in the core.

3. Example Method

Figure 15A:
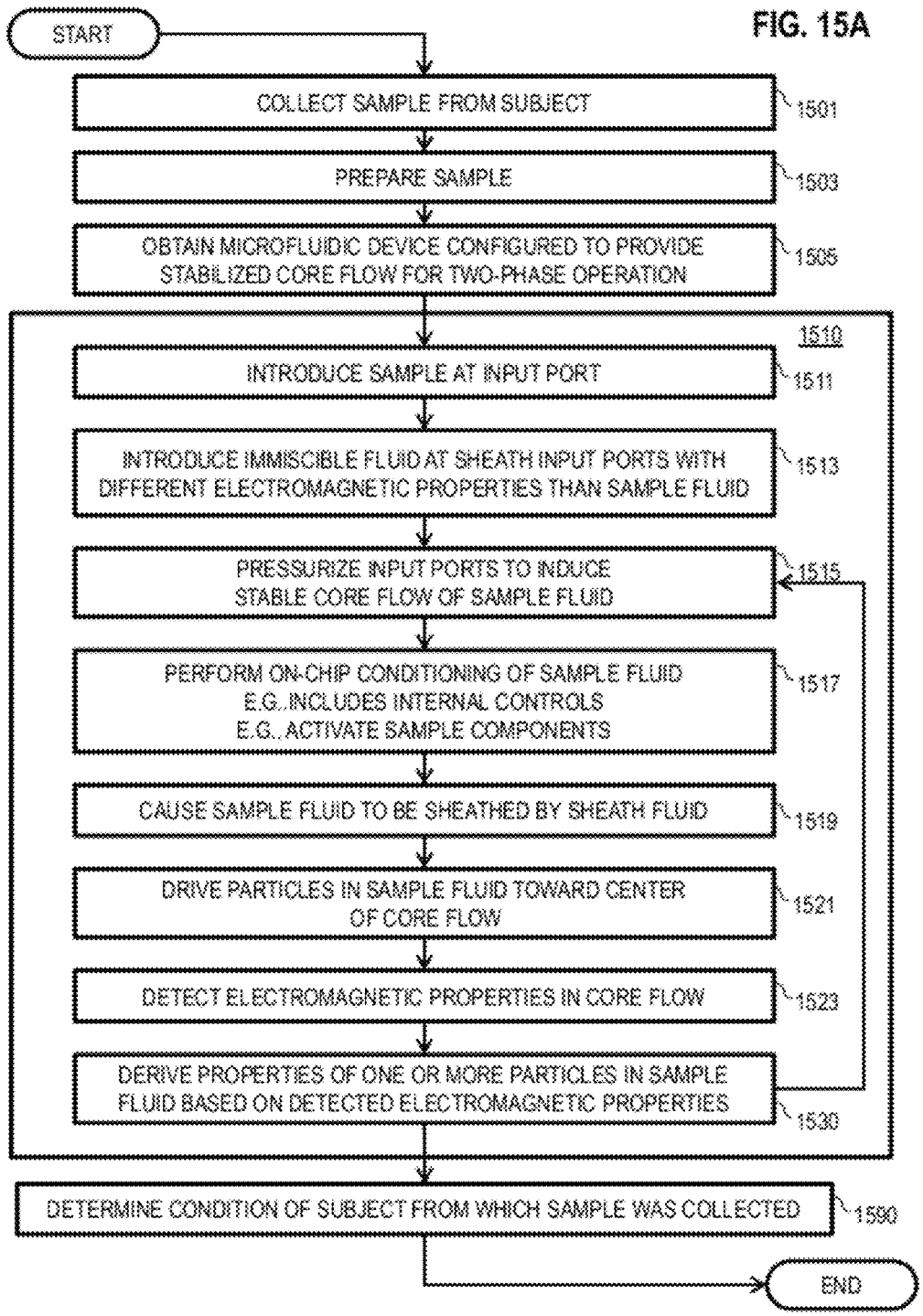
FIG. 15A and FIG. 15B are flow charts that illustrate an example method for determining condition of a subject based on a microfluidic device, according to various embodiments.
Figure 15B:
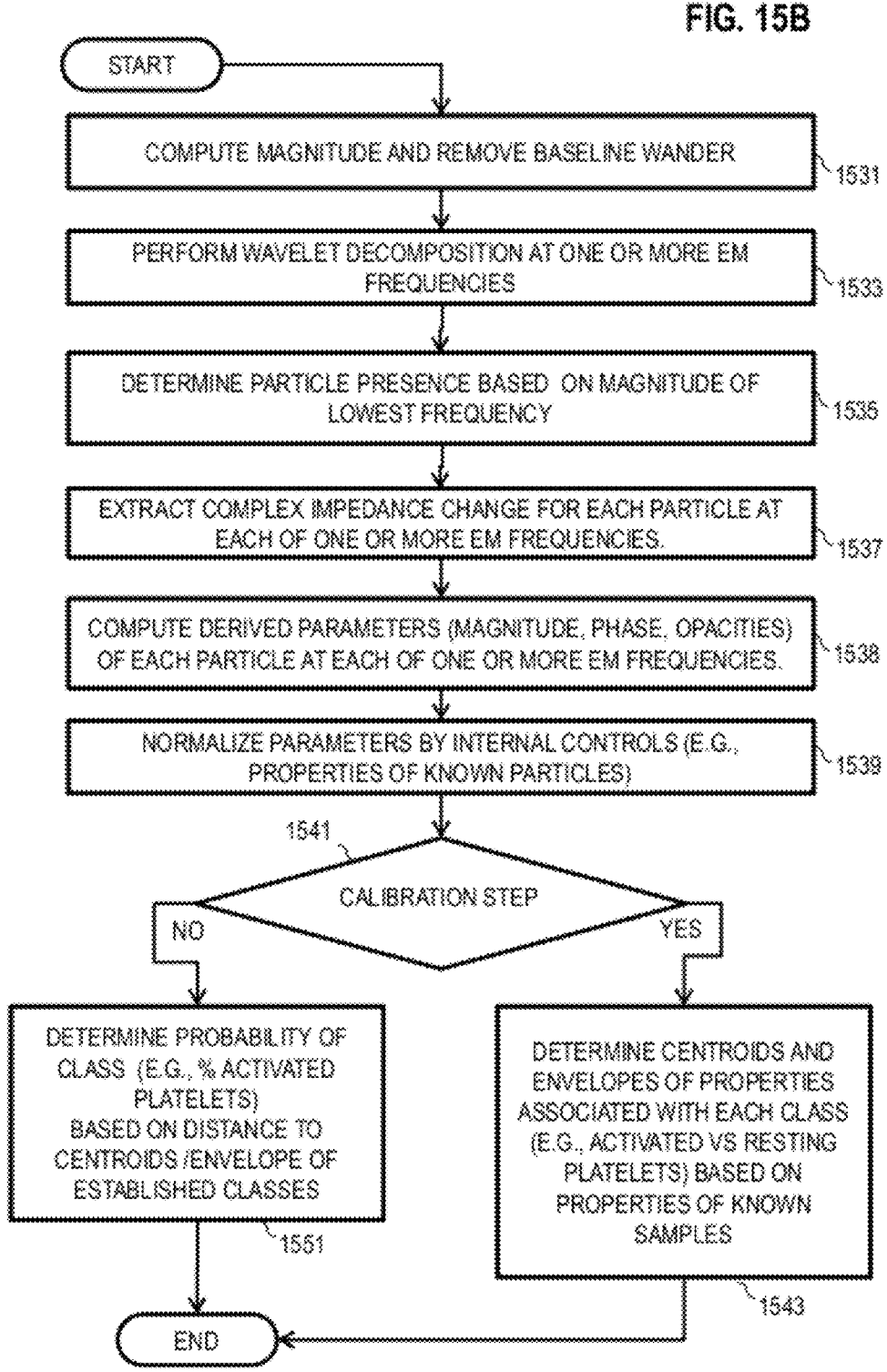

FIG. 15A and FIG. 15B are flow charts that illustrate an example method for determining condition of a subject based on a microfluidic device, according to various embodiments. Although steps are depicted in FIG. 15A and FIG. 15B as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 1501, a sample is collected from a subject. For example, a blood sample is collected from a patient. In a calibration embodiment, a sample with known values of one or more properties, such as known percentage of activated platelets, is collected during step 1501.

In step 1503, the sample is prepared prior to introduction to the apparatus. For example, the sample is diluted or filtered or prepped in any other manner known in the art. In one embodiment, the blood sample is centrifuged to separate the platelet rich plasma (PRP). The platelets are then re-suspended in Tyrode's buffer with added chemicals (such as bovine serum albumin, acid citrate dextrose, apyrase) to limit aggregation and activation. In some calibration embodiment, the prepared platelet sample is used as-is (resting sample, usually containing more than 90% resting platelet in healthy subjects), or mixed with a thrombin receptor-activating peptide (TRAP) to force platelet activation and generate a calibration sample with a high percentage (80-90%) of activated platelets (activated sample). In some embodiments, the known particles 540 are added to the sample, for example at a known concentration. In some embodiments, one or more sample preparation steps are performed in the apparatus, as described below with reference to step 1517, and the preparation performed in step 1503, if any, is complimentary to preparation performed in the apparatus.

In step 1510, the prepared sample is processed in the apparatus, such as apparatus 500 described above with reference to FIG. 5A. One or more steps performed in the apparatus are described in more detail below.

In step 1590, the condition of the subject from whom the sample was collected, or a calibration result, is determined based on the properties derived by the apparatus. For example, the apparatus is determined to be calibrated, or the patient is determined to have normal or abnormally elevated numbers of activated platelets. In some embodiments, the apparatus performs other ancillary analyses that allow a more comprehensive determination in step 1590. For example, in some embodiments, based on the presence of another marker together with the results of the assessment of platelet population, it is determined that a patient from whom the sample was drawn is at increased cardiovascular health risk. In another example, changes in proportions of activated platelets before and after taking a specific may reflect the efficacy of this drug, or on the contrary the resistance of the subject to this drug.

In an illustrated embodiment, step 1510 includes one or more of steps 1511 through 1530. In step 1511, the sample is introduced at an input port, such as sample input port 504. For example a pipette containing the prepared blood sample is emptied into a chamber in the apparatus connected to the input port 504. In step 1513 one or more sheath fluids (such as immiscible sheath fluids in a preferred embodiment) with different electromagnetic properties from the sample fluid are introduced at two sheath input ports, such as sheath fluid input ports 506a and 506b. For example, a reservoir connected to the input ports 506a, 506b, is filled with mineral oil that has higher electrical impedance and lower dielectric than the prepared blood sample.

In step 1515, the fluids at the input ports are subjected to pressures to induce stable fluid flow of sample fluid through the central microchannel. For example, the sample fluid chamber and the reservoir of sheath fluids are pressurized, respectively, by separate diaphragms actuated by a pressure source, such as a hydraulic fluid pressurized by a piston or a column of water or other fluid. In another embodiment, the pressurization may be effected by application of a regulated air pressure directly to each fluid. In some embodiments, as described above, stability is provided in part by dynamically adjusting the pressure applied to the sample fluid chamber or reservoir of sheath fluid, or both, based on observed core properties, such as width, detected during step 1530, described below. As a result of the pressurization, the sample fluid flows as a core flow between two sheath flows through a microchannel to the exit port, e.g., through microchannels 502 toward exit port 508.

In step 1517, any on-chip conditioning is performed, e.g., as the sample flows through the sample conditioning components 530. For example, filtering, buffering, diluting and platelet activation, alone or in some combination, is performed on the sample passing through the sample conditioning components 530. In some embodiments, the conditioning components 530 add known particles 540 at a known rate into the microchannel carrying the sample.

In step 1519, the conditioned sample is caused to be sheathed by the sheath fluid. For example, the microchannels 502 carrying sheath fluid meet the microchannel carrying the conditioned sample at a junction.

In step 1521, particles in the sample are driven toward the center of the core flow, e.g., using dielectrophoresis induced by the dielectrophoresis components 550.

In step 1523, the electromagnetic properties are detected in the core flow, e.g., using core fluid sensors 560. The detection is concentrated in the core flow by the difference in the electromagnetic properties of the sample and sheath fluids. For example, optical transmission or electrical impedance is measured, with greater sensitivity to perturbations that occur in the core flow, as described above.

In step 1530, properties of one or more particles in the sample fluid are derived based on the detected electromagnetic properties. For example, temporal or spatial variations in the electromagnetic properties of the core flow are used to characterize particles carried by the core flow. Variations in the properties of known particles 540 are used to determine variations in the core flow, such as core width or core fluid average properties, and used, in some embodiments, to dynamically adjust the pressures on the sample chamber or sheath fluid reservoir, or both, in step 1515. Such dynamic adjustments can be achieved by ultra-rapid pressure-based flow controller such the Fluigent Microfluidic Flow Control System (FASTAB Technology, Fluigent, Paris, France). For example, the percentage of activated platelets is determined based on the detected electrical impedance properties of a number (e.g., at least 50) of platelets.

In some embodiments, step 1530 includes determining properties of the core flow itself, such as rate or width or both. If the impedance of the core flow is directly measured with a just one pair of electrode, then the core width and average properties can also be detected. This is an advantageous mode of sensing the core properties in the absence of particles. Also, this determination can be done anytime—not only when a calibration particle passes between the electrode, and, thus, can provide the advantage of a faster real-time control of the core flow properties.

In some embodiments, step 1530 includes one or more of steps 1531 to 1551 of FIG. 15B. In step 1531, the magnitude of the impedance variation is computed at one or more electromagnetic frequencies. For example, magnitude=$\sqrt{(X^2+Y^2)}$, where X is the in-phase component of the signal and Y is the out-of-phase component. Baseline wander (due to slow flow fluctuation for instance) is removed from one or more electromagnetic frequencies, e.g., using a Savitsky-Golay filter. In an experimental embodiment, the slow variations (baseline wander) are extracted with a Savitzky-Golay filter of low order (e.g., 3), and a frame size longer than the slowest particle events (e.g., 70 ms, or 501 samples at 7.2 kilosamples per second, ksps, where 1 ksps=$10^3$ samples per second). These baseline wanders are then subtracted from the original magnitude signals for each frequency to leave only fast, particle-related events.

In step 1533, wavelet decomposition is performed at one or more electromagnetic frequencies of the measured impedance. Due to the properties of wavelet transforms, wavelet-based algorithms are inherently well-suited for the detection of transient events (see, for example, S. Mallat, *A Wavelet Tour of Signal Processing*, 2 ed. San Diego, Calif.: Academic, 1999, the entire contents of which are hereby incorporated by reference as if set forth herein, except so far as the terminology is inconsistent with that used here). The algorithm used typically two levels of wavelet decomposition to increase robustness. In one embodiment, a quadratic spline wavelet (see, for example, C. Li, C. X. Zheng, and C. F. Tai, *Detection of ECG characteristic points using wavelet transforms*, IEEE Trans. Biomed. Eng., vol. 42, no. 1, pp. 21-28, January 1995, the entire contents of which are hereby incorporated by reference as if set forth herein, except so far as the terminology is inconsistent with that used here) is used to perform a dyadic wavelet transform of the impedance magnitude up to scale 5. Scales 4 and 5 were found typically to have the most frequency overlap with particle events. Triphasic patterns in the wavelet decomposition, characteristic of the biphasic impedance change measured by the differential measurement configuration, are then searched in scales 4 and 5, typically. This search is done by finding peaks above a defined threshold (set manually or calculated from an estimate of the signal noise), and interpreting the timings of these peaks (two maximum close to a minimum are qualified as an event). Events detected on each scale are then pooled to increase the robustness of the particle detector to noise and variability in event shapes, and flexibility to various size and types of particles.

In step 1535, the presence of a particle is determined using the WT-based algorithm described above based only on the magnitude signal at the lowest frequency (found to be the most sensitive to the passage of particles).

In step 1537, the real and imaginary part of the impedance variation at each of one or more electromagnetic frequencies is determined by extraction of peak amplitudes in in-phase components (X) and out-of-phase components (Y) for each frequency.

In step 1538, the magnitudes and phases are then derived. In some embodiments, only amplitude is used, because experiments showed that phase was mostly redundant. The particle or platelet is then characterized by a vector of the relative real components, imaginary components, magnitudes or phases or any combination of one or more electromagnetic frequencies and zero or more derived quantities, such as opacity features (ratio of impedances at two frequencies).

In step 1539, amplitudes so detected are normalized by internal controls, such as the measured impedances and derived parameters of the known particles 540. For example, because of the remaining variability of the fluidics (core size, flow, centering in channel, sample fluid variations among samples, among others), the best results were obtained when all platelet parameters (impedances and derived parameters) were divided by the averaged values measured over the duration of the sample analysis for 10-mm polystyrene beads added to the solution as an internal control. In other embodiments, the normalization is performed using the value of the nearest calibration bead in the sample stream, or interpolated between two neighboring calibration beads. Beads can be identified in the data sets based on a simple magnitude threshold reflecting large size difference between the beads used as internal controls and target particles. In other embodiments, other parameters are used to identify the beads.

In step 1541, the process diverges based on whether calibration or sample analysis is being performed. If calibration, the next step is 1543. If the system is already calibrated and is being used to detect properties of particles in an unknown sample, such as platelets, then the next step is 1551.

In step 1543, the vectors associated with known values of the particle properties are analyzed by cluster analysis to determine how to classify such particles, e.g., by defining the center and envelopes of vectors that represent each class. In some embodiment, the classes are sufficiently separated that a simple histogram analysis can separate and quantify the various populations, such as between 10 μm polystyrene beads and 5 μm polyamide beads, or platelet and red blood cells (as described below with reference to FIG. 20B). For populations exhibiting more subtle differences in impedances (e.g., activated vs. resting platelet, FIGS. 17A and 17B), statistical approaches are employed. In various embodiments, a principal component and discriminant analysis were used. For example, discriminant analysis is performed, which differentiates between activated and resting platelets within each calibration sample. Measurements at multiple frequencies are taken from two samples—one containing resting platelets and 10-μm polystyrene beads, the other containing activated platelets and the same 10-μm polystyrene beads. Each sample is typically composed of more than 90% of the dominant species—resting or activated. First, data from beads are extracted from the data sets (based on simple magnitude threshold reflecting large size difference between the beads and platelets). Beads parameters are averaged over all detected beads and used to normalize all platelets parameters. Then a discriminant analysis is performed on the pooled platelet parameters, with all the platelets coming from the resting sample labeled 'resting', and all platelets coming from the activated sample labeled 'activated'. The discriminant analysis projects the data sets onto canonical vectors that have the most discriminating effect on the dataset. These vectors, and the associated class centroids, can then be used to re-classify each sample, or applied to new samples as in step 1551.

In step 1551, the probability of an unknown particle to belong to the resting platelet or activated platelet class is determined based on previously-established classification vectors. Measurement of many platelets will thus characterize the population, and lead to a number reflective of the degree of platelet activation of the sample (percentage of activated platelet). Alternatively, a score based on the unknown platelet's parameter projections on these calibration vectors can be used to provide a degree of activation for each platelet, rather than a bimodal classification.

In order to validate the dielectric hydrodynamic focusing concept, experiments with particles (polystyrene particles with a 10 µm diameter) were performed. These experiments enabled the quantification of the performance improvement brought by the proposed approach, These techniques were shown to be capable of simple size discrimination based on the impedance of a particle at a single electromagnetic frequency (1.2 MHz) in which 10 micron particles are polystyrene beads, and 5 micron particles are nylon beads from a blood-mimicking solution (Supertech CIRS 046).

Important results include the large improvement brought about by the two-phase flow in both sensitivity and signal-to-noise ratio (SNR) compared to standard aqueous hydrodynamic focusing. In the case of aqueous hydrodynamic focusing, the increase in SNR expected from the reduction of the core is negated somewhat by the diffusion effects, increasing relatively at smaller core width. In contrast, two-phase focusing gets the full benefits from the narrow core, since diffusion is substantively non-existent. Average detection signal, $\Delta I/I_{baseline}$, was determined for the passage of single 10-micron polystyrene beads in a phosphate buffered saline (PBS) solution with a range of core widths from 27 to 145 microns (all aqueous) and for a two-phase flow (oil sheath, 33 micron core width). For a fixed excitation voltage of 400 milliVolts, root mean square (mVrms, 1 mV=$10^{-3}$ volts), a detection signal of 1.4±0.6% is measured for a 27-micron aqueous core, whereas the two-phase system has a signal of 5.1±0.5% for averages of 21 measurements. The signal-to-noise ratio for the various core sizes showed no significant dependence on core size for the aqueous cores. For the two-phase system, a 23 dB improvement compared to the smallest aqueous core is observed.

Figure 16A:
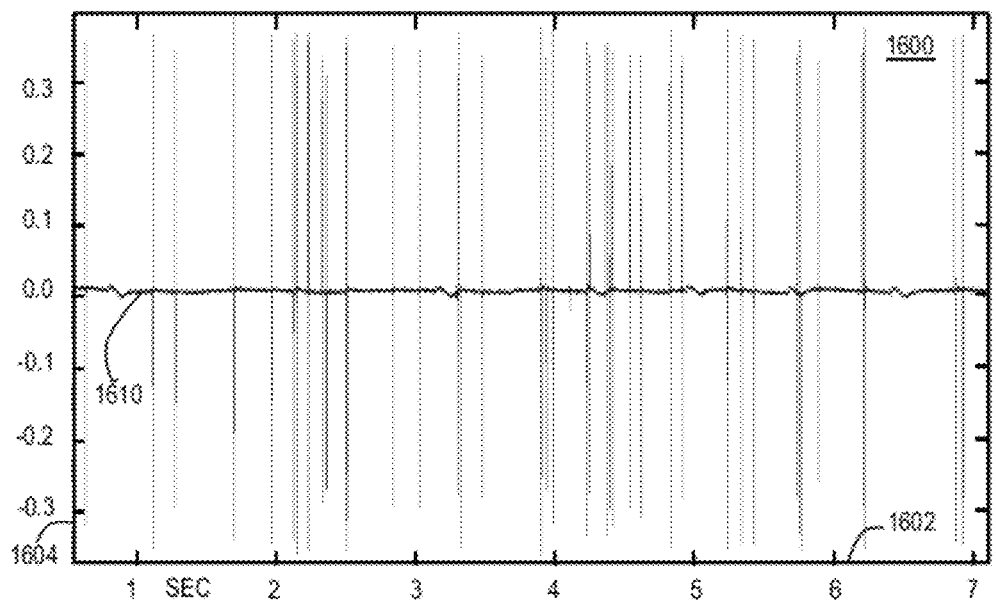
FIGS. 16A and 16B are graphs that illustrate example detection of particles in a core flow, according to an embodiment.
Figure 16B:
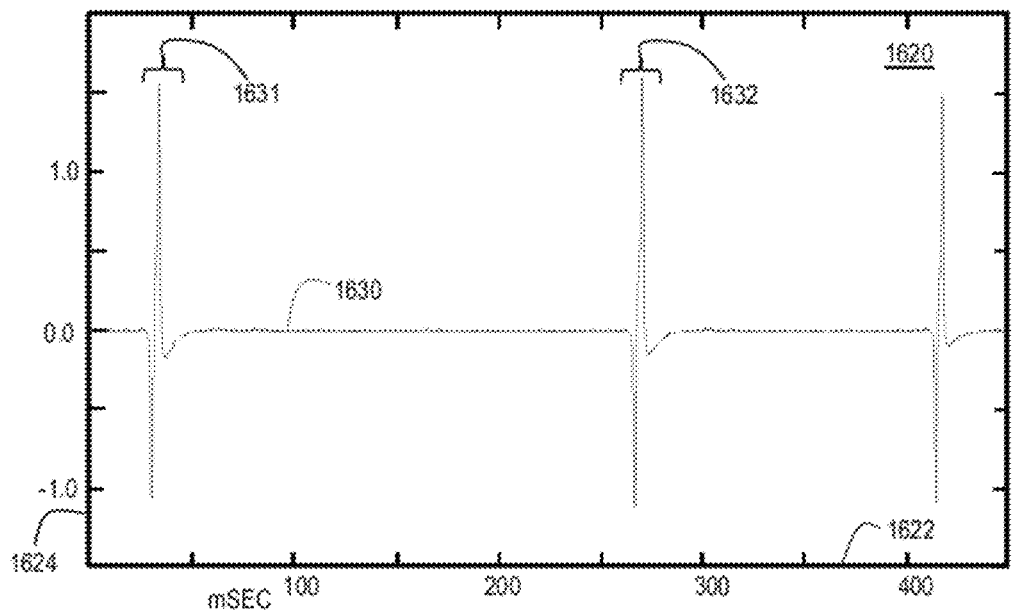

Using the core fluid impedance sensors FIG. 5B, traces (real part of impedance, after baseline-wander removal) of 10 µm polystyrene particles in oil/water flow were plotted. FIGS. 16A and 16B are graphs that illustrate example detection of particles in a core flow, according to an embodiment. FIG. 16A depicts a typical trace of these particles. The horizontal axis 1602 is time in seconds; and, the vertical axis is impedance difference between successive electrodes as outputted in volts by the measuring instrumentation (lock-in amplifier). The trace 1610 is near zero when there is no particle between either pair of electrodes, and the trace 1610 spikes both negatively and positively as a particle passes the core fluid sensors (differential configuration). FIG. 16B depicts a close-up of individual signals from individual particles, from a separate experiment. The horizontal axis 1622 is an expanded time axis in milliseconds; the vertical axis 1624 represents the impedance change as outputted in volts by the measuring instrumentation. As shown in FIG. 16B, each peak includes a decrease in voltage as the particle passes between the first pair of electrodes followed by an increase as the particle passes between the second pair of electrodes.

4. Determining Platelet Activation State

According to an example embodiment, the techniques are applied to determine the number or fraction of platelets in an active state. These embodiments address a clinically important application related to the measurement of platelet activation in blood, and embodies several aspects of the invention, including measurement of micron-size, shear-sensitive cells.

Figure 9A:
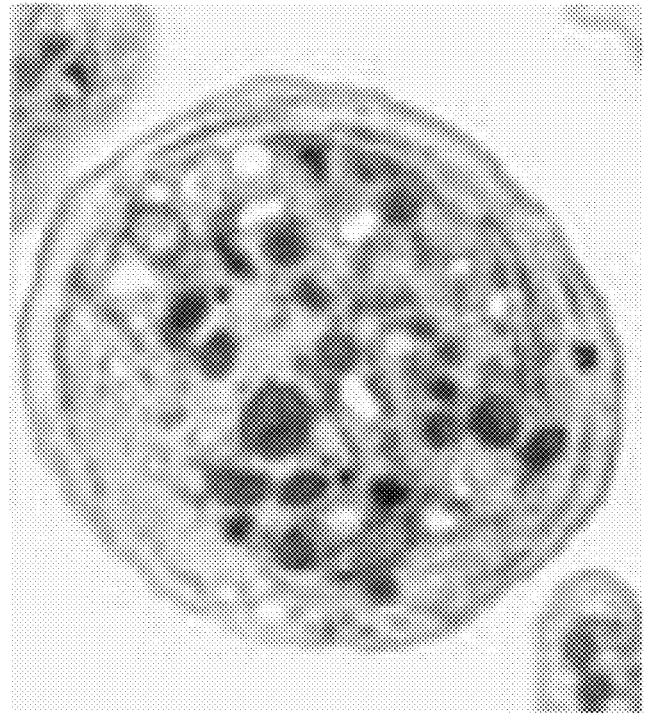
FIGS. 9A and 9B are micrographs that illustrate resting platelet and an activated platelet, respectively.
Figure 9B:
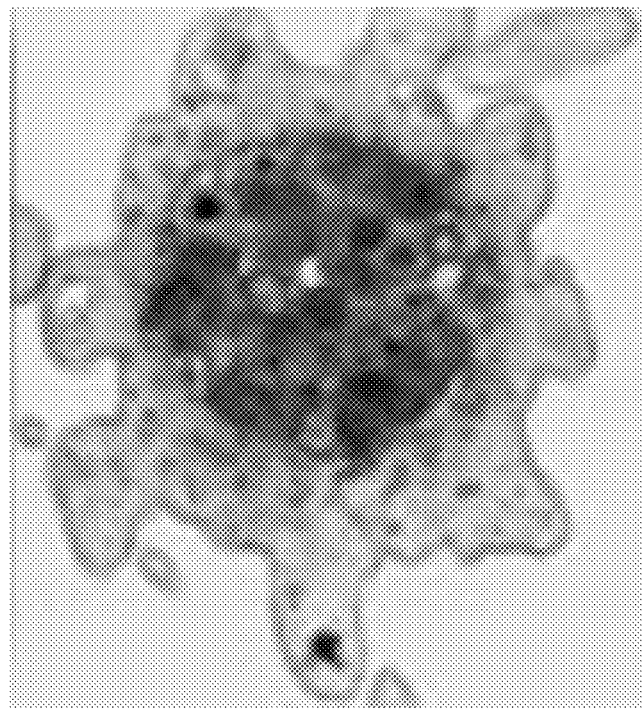

FIGS. 9A and 9B are micrographs that illustrate a resting platelet and an activated platelet, respectively. FIG. 9A is magnified 10,000 times and 9B only 5000 times. These micrographs reveal the marked difference in size and morphology that characterizes activation. Blood platelets are anuclear and discoid, 1.5 to 3.0 µm in diameter. The human body has a limited reserve of platelets which, therefore, can be depleted rapidly. Platelet activation has been linked to the presence of disease, and therefore is an important disease indicator.

Most previously available tests characterize platelet function as a consequence of challenge by a chemical or physical agonist (with variable predictivity) without direct measure of the endogenous platelet states in blood circulation. Direct indication of the endogenous activation state is currently only available through the use of flow cytometry, primarily by measuring the presence of certain proteins and receptors known to be expressed (e.g., CD62p, also known as P-selectin) or known to change conformation (e.g. GPIIb/IIIa) upon activation (Michelson 2000). These methods involve labeling the relevant proteins with one or more fluorophores or other labels for optical detection. These methods are very sensitive, quantitative, and provide information on individual platelets. They are, however, expensive, time-consuming, and mostly found in specialized or central laboratories.

One of the main challenges with applying the simpler, cheaper and faster techniques of impedance spectroscopy to platelets is the small size of the platelets. Small platelets will generate a very weak impedance signal if the channel in which they flow is too large. Reducing channel size, to achieve a signal to noise ratio (SNR) that is acceptable for measurements, generates shear that is not suitable for platelets, stressing them sufficiently to damage them or change their activation state.

In an illustrated embodiment, integrated fluid flow and electrical finite-element modeling (FEM) are used to properly dimension channels and flow rates to limit shear stress, while achieving optimal signal-to-noise ratios in the impedance spectrum measurement. For example, the COMSOL Multiphysics software package for Matlab® is used to perform integrated fluidic and electrical finite-element modeling simulations. High-resolution spectra over a large frequency range are built frequency-by-frequency, averaging multiple platelets (n=200-500) for each frequency. Mixed populations of activated and non-activated platelets are delineated statistically. Indeed, it is not practical to obtain a population of 100% non-activated or 100% activated platelets as reference, for various practical reasons, such as residual activation level and aggregation. Instead, samples with varying levels of activation are used and the distributions of impedances is correlated with these levels. This enables the association of specific impedance distributions with activation levels for each individual frequency.

For example, in an example embodiment, measurements are used to characterize the impedance at 20-30 frequencies, over a frequency range of 100 Hz-50 MHz. This range should cover three domains of interest: low frequencies, where the platelet is basically non-conductive (signal proportional to size), medium frequencies, where the signal is sensitive to membrane properties (β dispersion), and high frequencies, where the signal is related to the cytosol structure and properties. It should be noted that while the lower limit of 100 Hz might be practically difficult to achieve (electrode polarization, measurement time), the information between 100 Hz and 1-10 kHz is not expected to be critical. Analysis of the high-resolution spectra allows determination of a subset of frequencies having the best discriminating power. The measurement setup allows simultaneous probing of these frequencies, allowing real-time characterization of individual platelets.

FIG. 10 is a graph 1000 of simulated data of the impedance spectrum of a mixed population of activated and resting platelets, according to an embodiment. The horizontal 1002 axis is frequency in arbitrary units and the vertical axis 1004 is simulated impedance in arbitrary units. FIG. 10 shows a simulated spectrum of impedance measurements 1008 at different AC frequencies. FIGS. 11A through 11F are graphs of simulated histogram data of the impedance at various frequencies for platelet populations activated to various degree with adenosine diphosphate (ADP), according to an embodiment. Each horizontal axis is 1102 impedance in relative units; and each vertical axis 1104 is count, in relative units. In this simulated case, spectra are clearly different between activated and resting platelets. The histograms on the left (FIG. 11A, FIG. 11C and FIG. 11E) show the relative contributions of activation states for a low degree of activation at three discrete AC frequencies (f1, f2, f3). The histograms on the right (FIG. 11B, FIG. 11D and FIG. 11F) show the relative contributions of activation states as the degree of activation is chemically increased with adenosine diphosphate (ADP) for the same three AC frequencies.

Figure 12:
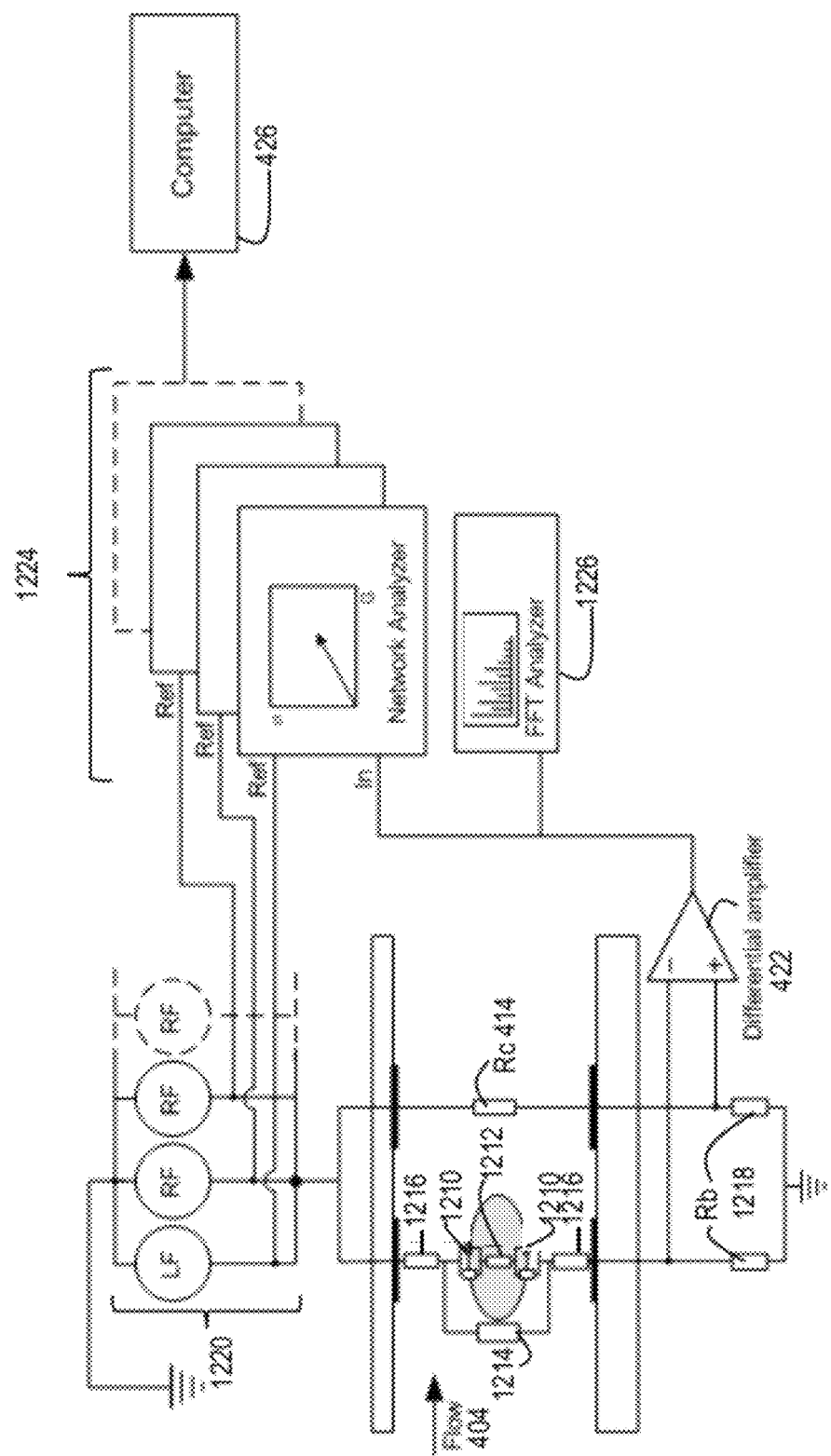
FIG. 12 is a diagram that illustrates electromagnetic measurement apparatus for multiple frequencies, according to an embodiment.

FIG. 12 is a diagram that illustrates electromagnetic measurement apparatus for multiple frequencies, according to an embodiment. This is a particular embodiment of the core fluid sensors 560. This arrangement includes multiple frequency excitation 1220, with corresponding multiple frequency discriminators using network analyzer modules 1224, and a fast Fourier Transform (FFT) analyzer module 1226. Digital output describing differential impedance at multiple frequencies is sent to the computer 426. The data are plotted as in FIG. 10 to select discriminating frequencies f1, f2, and f3 and generate the histograms of FIGS. 11A through 11B. The model includes frequency dependent values of resistance or capacitance in the membrane 1210 (Rm,Cm), cytoplasm 1212 (Rc), particle 1214 (Rp) and fluid 1216 (Rs) as well as the channel 414 Rc. Resistance of the bridge circuit 1218 Rb is also considered.

In some embodiments, the histograms serve as calibration curves to determine the activation state of a population of platelets in a sample measured using the techniques described herein. A sample with platelet population in a low activation state (corresponding to the absence of disease or blood vessel injury) will better match the histograms on the left side. Conversely, a sample with platelet population in a high activation state (corresponding to the presence of disease or blood vessel injury) will better match the histograms on the right side.

Actual experiments with platelets indicated the differences between populations of activated and non-activated (resting) platelets is more subtle than depicted in FIG. 11A through 11F. Subsequent to the acquisition of the multi-frequency impedance analyzer, up to eight frequencies could simultaneously be acquired. A dynamic range and resolution large enough to capture the main transition frequencies expected (α and β relaxation) was provided by the instrument. Experiments aiming at increasing the frequency resolution did not appear to add discrimination power.

Most characterizations were done on Platelet-Rich Plasma re-suspended in a citrated tyrode solution with BSA and apyrase to limit activation and aggregation. Activation was performed with a thrombin-receptor activating peptide (TRAP). Gold-standard activation measurement was performed by flow cytometry, using CD61 (platelet marker) and CD62P (P-selectin, marker of activation) antibodies. Non-treated samples were considered 'resting'. At the dilution and flow rate used, a few thousands platelets were typically measured in one minute.

Figure 17A:
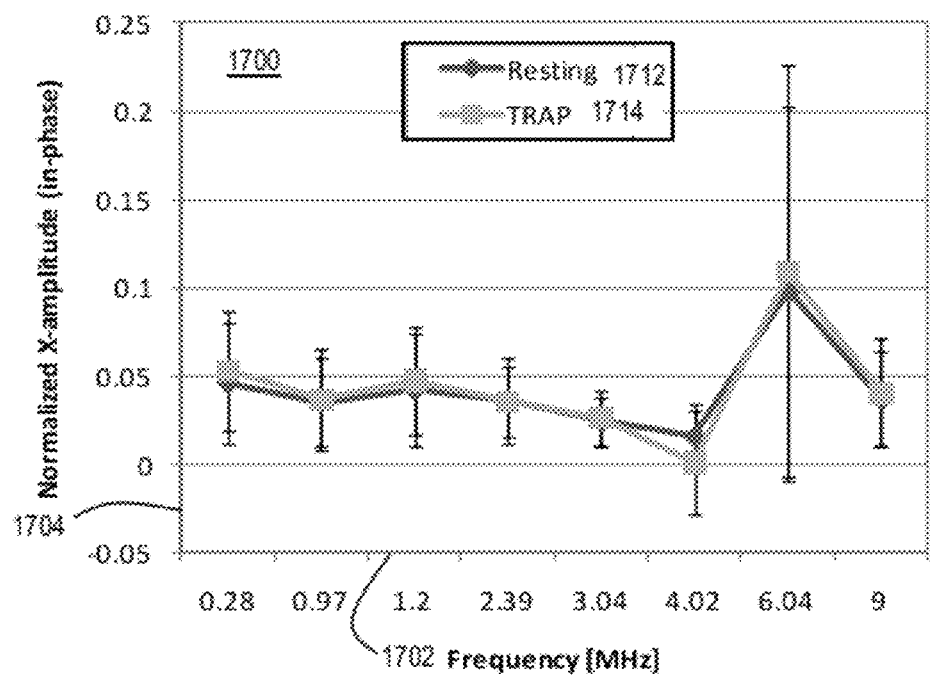
FIGS. 17A and 17B are graphs that illustrate example frequency response of resting and activated platelets, according to an embodiment.
Figure 17B:
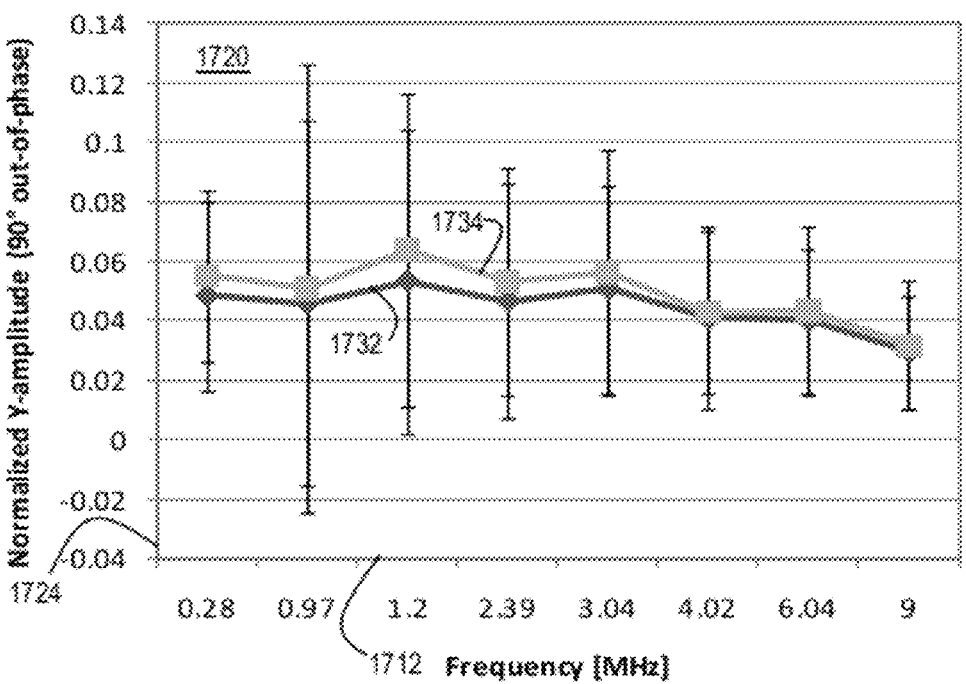

The characterization of impedance spectra for resting platelets (non-treated, around 5% activated platelets as confirmed by flow cytometry) and TRAP-activated (around 85% activated platelets as confirmed by flow cytometry) did not immediately reveal significant differences, as expected from the subtle changes in electrical properties upon activation. For example, FIGS. 17A and 17B are graphs 1700 and 1720, respectively, which illustrate example frequency response of resting and activated platelets, according to an embodiment. The horizontal axis 1712 represents electromagnetic frequency in MegaHertz (MHz, 1 MHz=$10^6$ hertz). The vertical axes 1704 and 1724 represent impedance difference (X representing in-phase/real, and Y representing 90°-phase/imaginary, respectively). Traces 1712 and 1732 indicate non-treated (resting) platelet samples in the two graphs, respectively; and traces 1714 and 1734 indicate TRAP-activated platelets in the two graphs, respectively. No significant difference between resting and activated platelets is noticed. Data is normalized to internal control (10 micron polystyrene particles). The larger variability in X at 6.04 MHz appears to be due to the low impedance of the internal control at this frequency.

Figure 18:
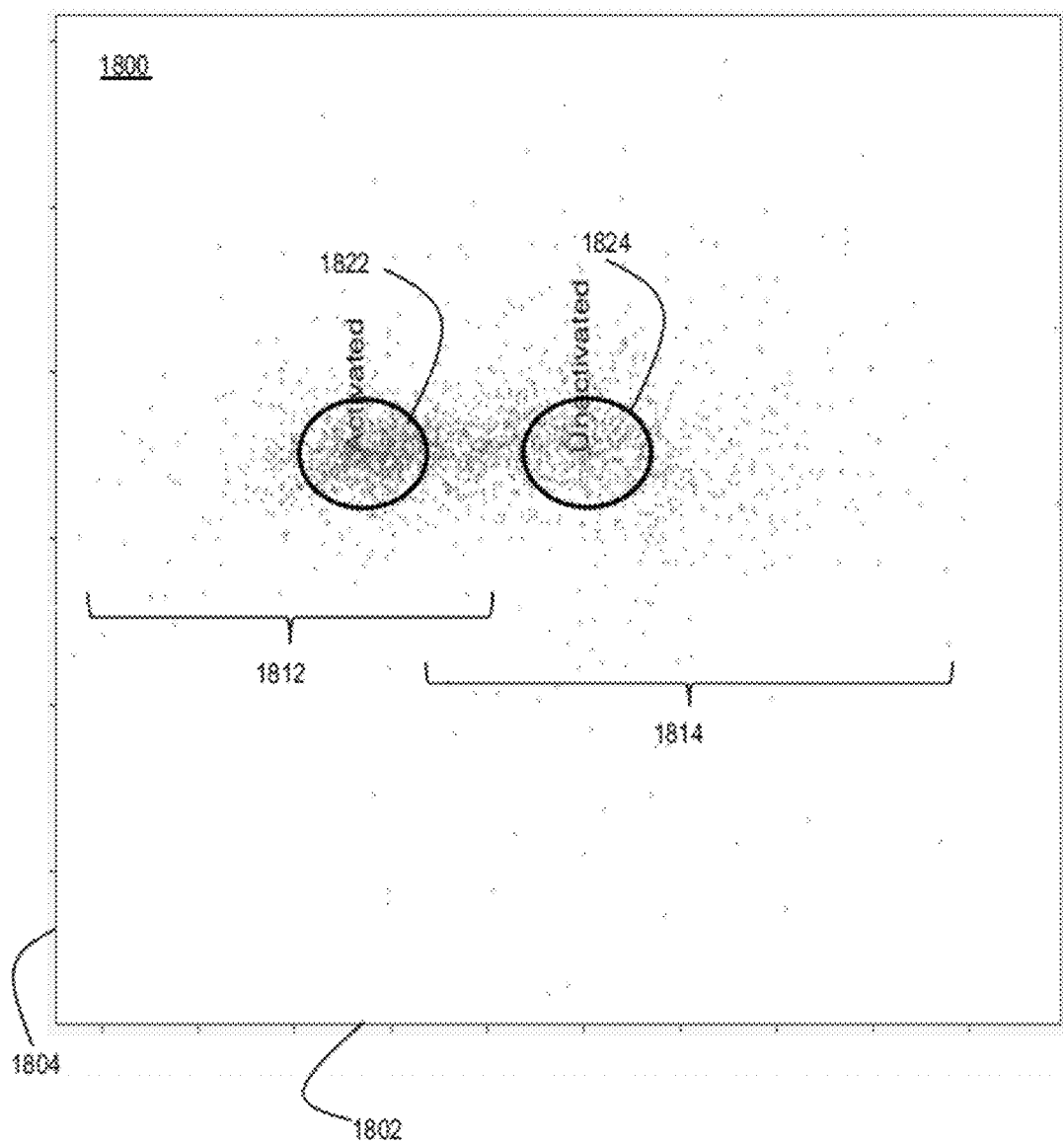
FIG. 18 is a graph that illustrates example classification of resting and activated platelets, according to an embodiment.

Even so, classification techniques are able to discriminate between activated and resting platelets. FIG. 18 is a graph 1800 that illustrates example classification of resting and activated platelets, according to an embodiment. The horizontal axis 1802 represents the amplitude of one canonical vector (also called a projection) in arbitrary units; and, the vertical axis 1804 represents the amplitude of a different, second canonical vector in arbitrary units. The dark data points 1812 come from a platelet sample that was activated with TRAP (thrombin receptor agonist); while the gray data points 1814 are from a sample of resting platelets. The software uses the different data parameters derived from the impedance spectroscopy and performs a discriminant analysis that differentiates between the activated and resting platelets within each sample. In the plot of the first two projections (that account for the two highest fractions of the total variance), activated platelets are grouped to the left while resting platelets are grouped to the right. The ellipses 1822 and 1824 of the activated and resting platelets, respectively, represent 50% of the population within each species.

These results led to other embodiments that consider more advanced statistical analysis on both raw features (in-phase/out-of-phase parts at various frequencies), and also opacity features (ratio of impedances at two frequencies). Because of the remaining variability of the fluidics (core size, flow, centering in channel, among others), more favorable results were obtained when the platelet data were normalized to polystyrene beads added to the solution as an internal control. These results are shown in FIG. 19, along with calibration data from FACS measurements.

Figure 19:
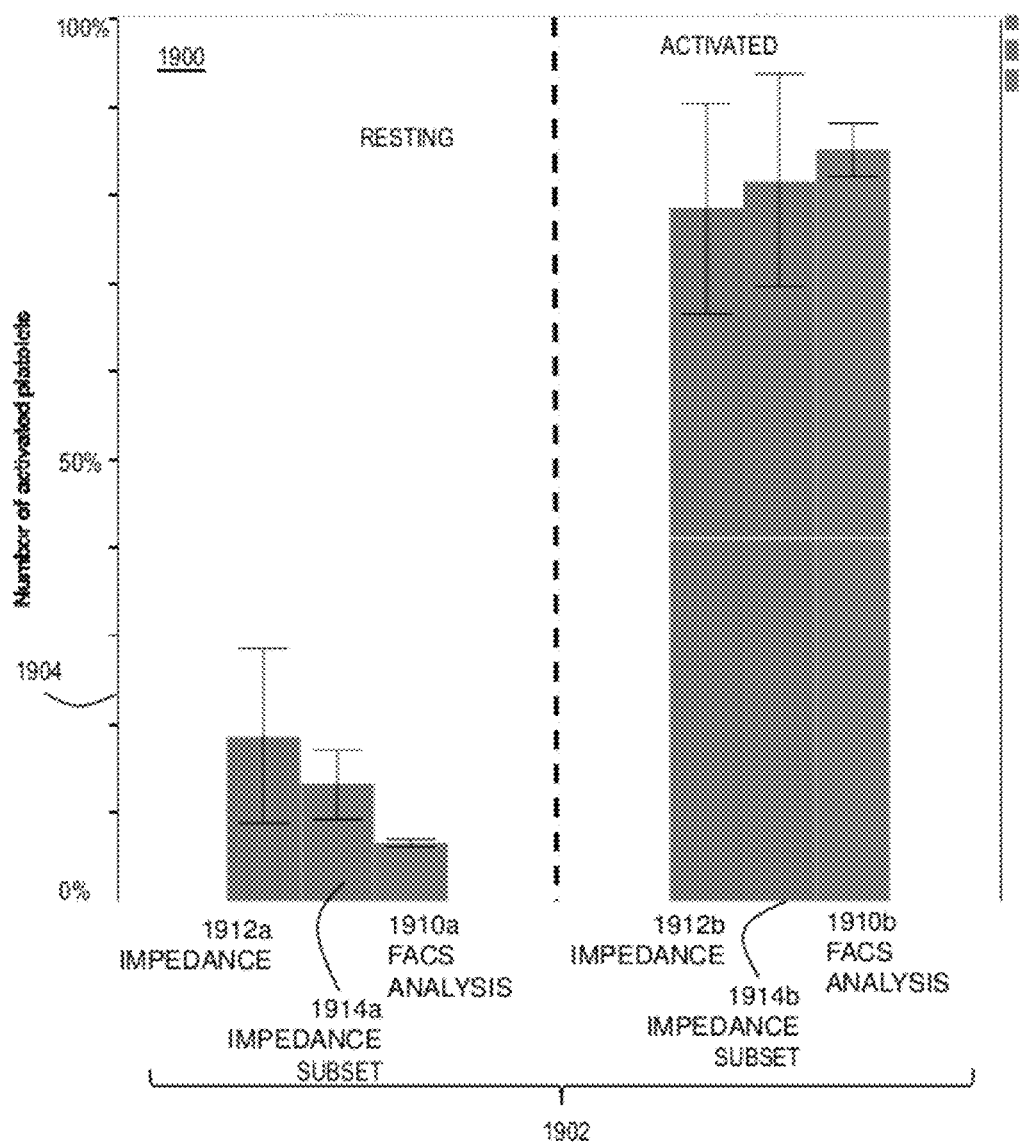
FIG. 19 is graph that illustrates example agreement of degree of platelet activation with a standard, according to an embodiment.

FIG. 19 is a graph that illustrates example agreement of degree of platelet activation with a standard, according to an embodiment. The horizontal axis 1902 indicates different groups of samples and the vertical axis 1904 indicates the number of activated platelets in the group as a percentage. Comparison of percentages of activation derived from microchannel impedance data, EIS 1912a 1912b (N=24) and conventional FACS analysis 1910a 1910b in two types of samples—resting (non-activated platelets) and activated (TRAP-activated platelets), respectively. Comparable trends demonstrate the ability of EIS to quantify the level of activation. Note that exact match between FACS and EIS was not expected due to the different features measured. EIS Subset 1914a and 1914b (N=5) represent a subset of data selected for their low variability in the internal control (polystyrene beads), an overall indicator of the stability of the fluidics. Stability of the internal control was assessed by the lack of discrimination of the control particles in the various samples based on the canonical vectors trained on the platelets.

One can see that the percentages of activated platelets calculated from impedance data are comparable to those obtained by the standard method of flow cytometry. It is important to note however that they should not be expected to be exactly equal, as both methods are measuring different indicators of activation. Because activation is more a graded state than an on/off state, different indicators would result in similar, but slightly different outcomes. This also shows that by down-selecting to only those datasets where the internal control was highly stable (an indication of stable measurement conditions), results could be further improved. This indicates that further refinement of the microfluidic system will likely increase the performance of the method (also called an assay in this context).

It was also verified that the device and measurement process were not leading to auto-activation of the platelet (through reactions with surfaces or shear). Flow cytometry measurements of resting platelets before and after measurements (collected at the output of the device) showed no significant difference (6.1% before, 5.9% after), in effect validating the low-shear design.

This project has led to the successful development of a microfluidic-based impedance flow cytometer, and the demonstration of a novel approach to maintain the signal-to-noise ratio of small channels while keeping large physical dimensions—two normally opposed parameters, both desirable simultaneously for the analysis of platelets without inducing activation. Several fluidic issues were investigated and feasibility demonstrated. Strong evidence supports the possibility of quantifying the levels of platelet activation in a sample by electrical impedance spectroscopy in a microfluidic device. It is anticipated that these techniques provide a means for the detection of disease and efficacy of disease treatment, e.g., to monitor platelet interactions with anti-platelet drugs such as clopidogrel or aspirin.

5. Characterization of Red Blood Cells (RBCs) and Leukocytes

Ideally, measurements should be performed on whole blood, allowing information on other blood constituents to be measured in addition to platelet data (e.g. red and white blood cell counts). The sample preparation would also be greatly simplified. Undiluted whole blood, however, contains so many cells that it is difficult to obtain signals from single cells. Alternatives would be to either dilute the blood or to selectively lyse the red blood cells as they are the most prevalent cell type in the blood. Diluting results in a sample that is easier to handle and the ratio between platelets and other blood cells will remain unchanged if the dilution is properly performed while a large number of cells will have to be analyzed in order to get statistically relevant data on the platelets. Lysing of the red blood cells will create ghost cells and membrane residues that, without careful washing of the sample, may interfere with the measurements.

However, limited experiments with samples prepared by differential centrifugation (reducing predominantly the concentration of RBCs) showed that it was possible to get information on both cell types, and that discrimination between both might be achievable by simple size discrimination (using typically the in-phase component of the impedance at low frequency).

Figure 20A:
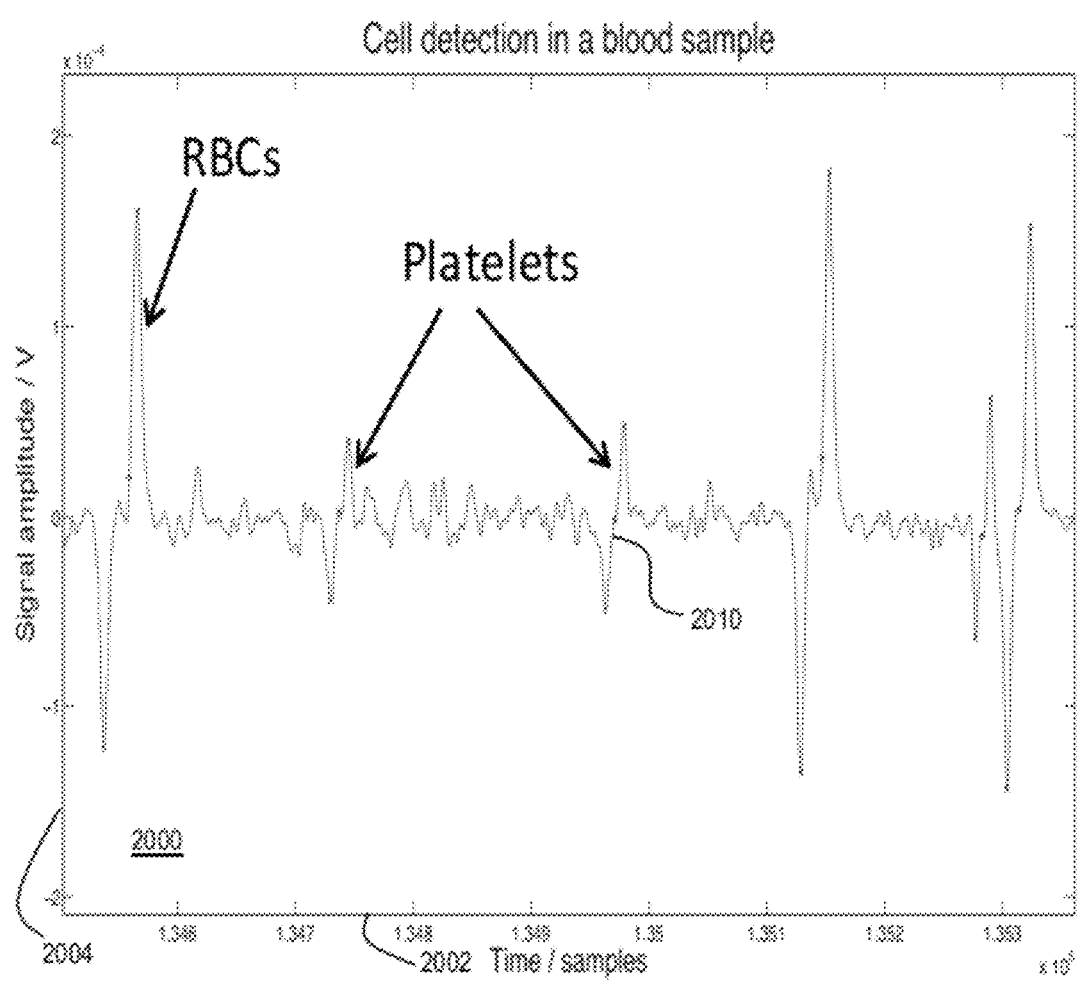
FIG. 20A and FIG. 20B are graphs that illustrate example detection of platelets and red blood cells in a blood sample, according to an embodiment.
Figure 20B:
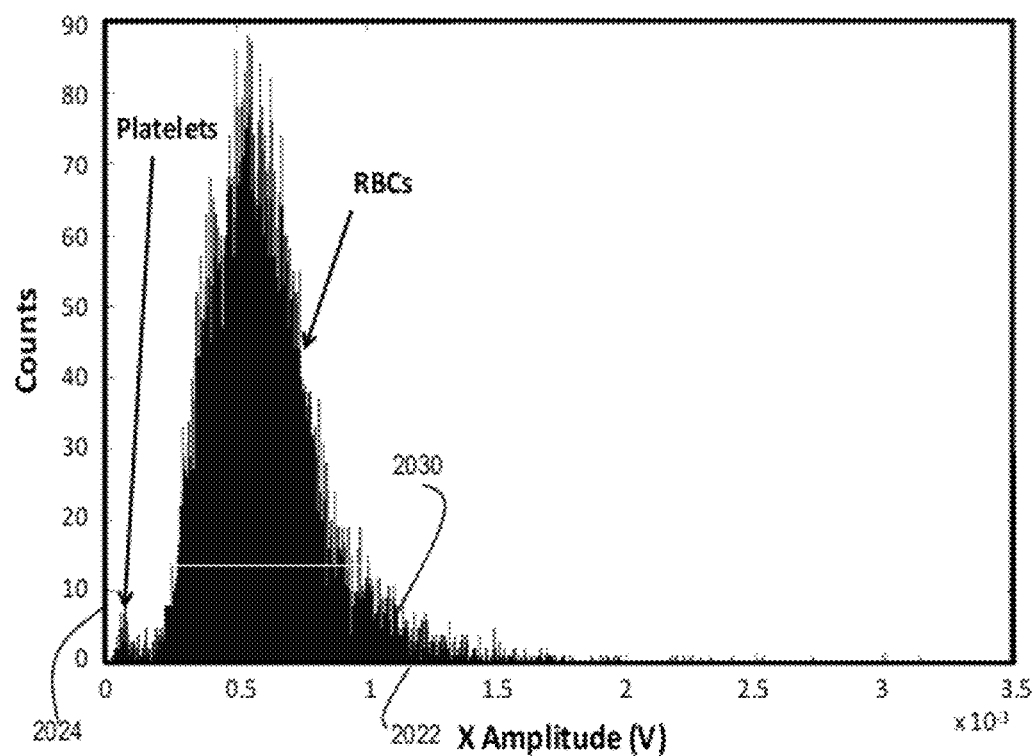

FIG. 20A and FIG. 20B are graphs that illustrate example detection of platelets and red blood cells in a blood sample, according to an embodiment. Depicted is a partly centrifuged whole blood sample. In FIG. 20A, in graph 2000, the horizontal axis 2002 is time in samples per seconds (sampling rate: 7.2 ksps) and the vertical axis 2004 is impedance signal in volts, as outputted by the measuring instrumentation. Trace 2010 is a typical impedance signal from a mixed population of platelet and RBCs. The trace 2010 is a raw signal for in-phase component of impedance (X), showing the different signature of red blood cells (RBCs, also called erythrocytes) and platelets. The RBCs cause the large peaks; and the platelets cause the smaller peaks.

FIG. 20B depicts a histogram 2020 of size distributions. The horizontal axis 2022 represents the X impedance value at low frequency (size-dependant); and the vertical axis 2024 indicates the number of peaks (count). The histogram 2030 shows the small distribution of platelets (low amplitudes) and the overwhelming distribution of RBCs, even in a partially-centrifuged sample. On the basis of these results with RBCs, discrimination of large leukocytes from small platelets based on size appears feasible.

6. Computational Hardware Overview

Figure 13:
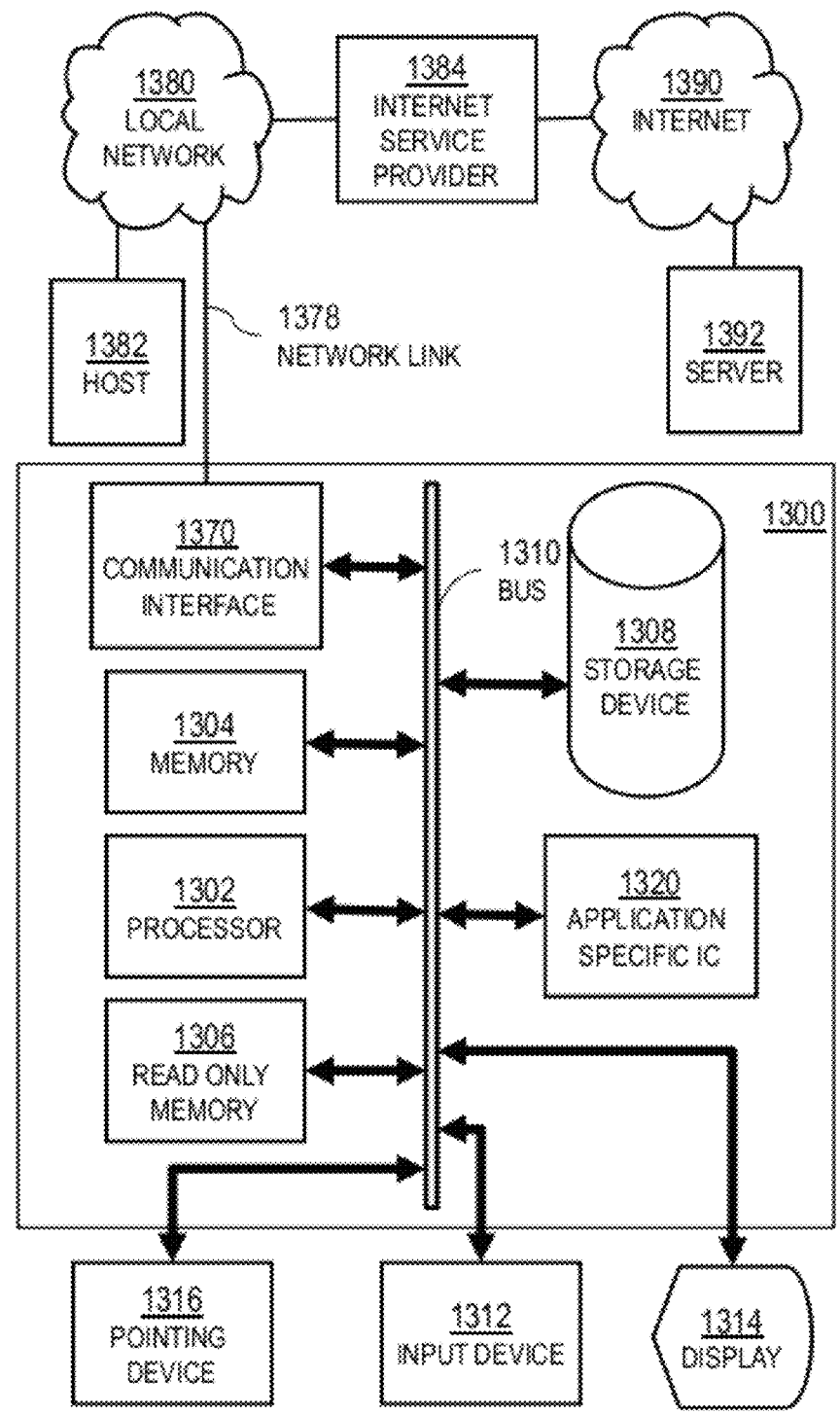
FIG. 13 is a block diagram that illustrates a computer system upon which an embodiment of the invention may be implemented.

FIG. 13 is a block diagram that illustrates a computer system 1300 upon which an embodiment of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of one or more methods described herein.

A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitutes computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Logic encoded in one or more tangible media includes one or both of processor instructions on a computer-readable storage media and special purpose hardware, such as ASIC 1320.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

Figure 14:
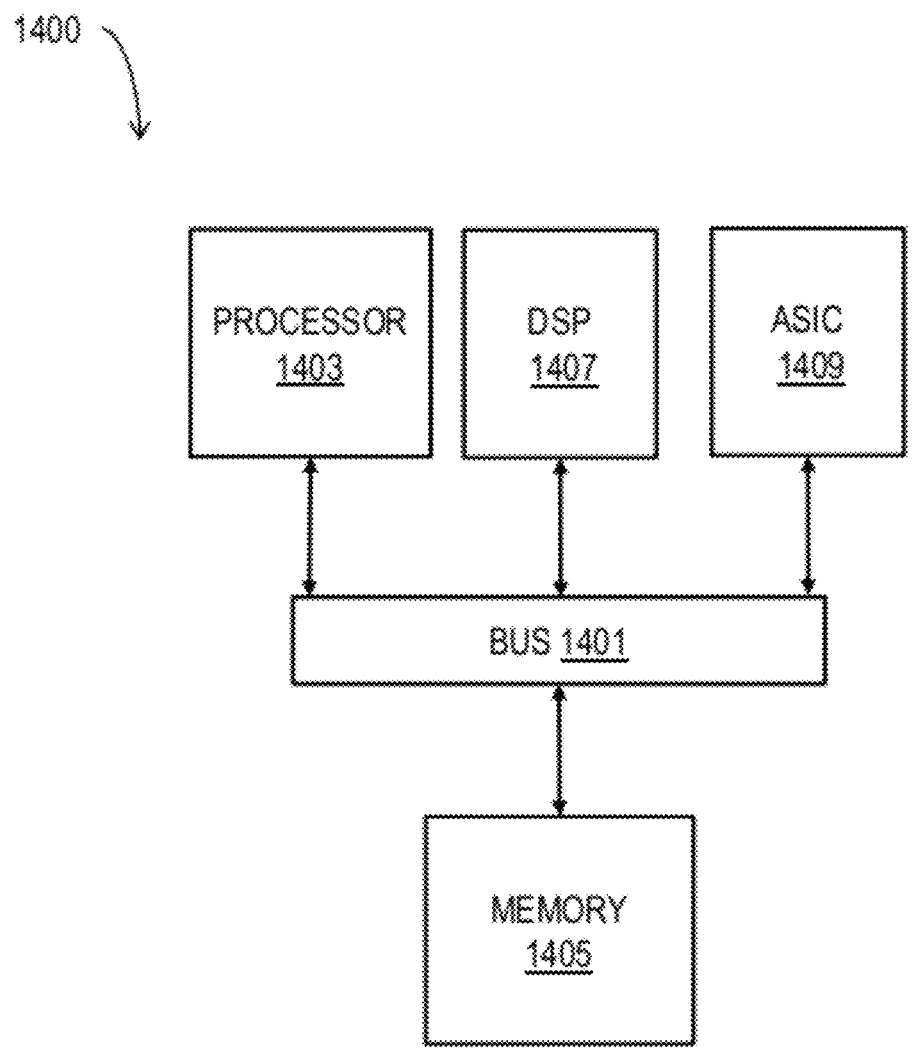
FIG. 14 illustrates a chip set upon which an embodiment of the invention may be implemented.

FIG. 14 illustrates a chip set 1400 upon which an embodiment of the invention may be implemented. Chip set 1400 is programmed to perform one or more steps of a method described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of a method described herein.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1405 also stores the data associated with or generated by the execution of one or more steps of the methods described herein.

7. Alterations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   causing a core fluid to flow into a channel between two sheath flows of one or more sheath fluids different from the core fluid, wherein a dielectric constant of a fluid constituting either sheath flow is less than a dielectric constant of the core fluid, and wherein flow in the channel is laminar;
   determining impedance in the channel based on measurements at a first pair of one or more pairs of electrodes;
   determining impedance of a particle in the core fluid; and
   introducing a plurality of uniform particles of known impedance value into the core fluid as an internal control.

2. A method as recited in claim 1, wherein determining impedance of the particle in the core fluid further comprises determining a temporal change in measured impedance in the channel between the first pair of electrodes.

3. A method as recited in claim 1, wherein determining impedance of the particle in the core fluid further comprises determining a difference between a first determined impedance in the channel at the first pair of electrodes and a second determined impedance at a different second pair of electrodes disposed along the channel separately from the first pair of electrodes.

4. A method as recited in claim 1, wherein a largest spatial dimension of the particle is less than half a width of the channel.

5. A method as recited in claim 1, wherein a largest spatial dimension of the particle is not greater than a narrowest spatial dimension of the core fluid.

6. A method as recited in claim 1 wherein the particle is a platelet.

7. A method as recited in claim 6, further comprising distinguishing an activated platelet and resting platelet based, at least in part, on impedance determined for the particle.

8. A method as recited in claim 1, wherein determining impedance in the channel at a first pair of electrodes further comprises determining impedance in the channel at the first pair of electrodes at a plurality of alternating current frequencies.

9. A method as recited in claim 8, wherein the plurality of alternating current frequencies span a frequency range greater than about 100 megahertz (MHz).

10. A method as recited in claim 1, wherein causing the core fluid to flow into the channel between two sheath flows further comprises controlling a narrowest spatial dimension of the core by controlling relative pressure or flow rate of a core fluid compared to a corresponding pressure or flow rate of one or more of the sheath fluids.

11. A method as recited in claim 10, wherein controlling relative pressure or flow rate of the core fluid compared to the corresponding pressure or flow rate of the one or more of the sheath fluids further comprises controlling the relative pressure or flow rate to stabilize a measurement of a property of the core.

12. A method as recited in claim 11, wherein the measurement of the property of the core is impedance determined in the channel at the first pair of electrodes.

13. A method as recited in claim 11, wherein the measurement of the property of the core is impedance determined in the channel at the first pair of electrodes when a particle is absent from the channel between the first pair of electrodes.

14. A method as recited in claim 11, wherein the measurement of the property of the core is impedance determined in the channel at the first pair of electrodes at a particular set of one or more alternating current frequencies.

15. A method as recited in claim 11, wherein the measurement of the property of the core is the width of the core between the two sheath flows in the channel in a vicinity of the first pair of electrodes.

16. A method as recited in claim 11, wherein the measurement of the property of the core is based on a measurement of a property of an internal control.

17. A method as recited in claim 16, wherein the internal control is a plurality of known particle of uniform properties.

18. A method as recited in claim 1, wherein the core fluid comprises polar molecules and the sheath fluid comprises non-polar molecules.

19. A method comprising:
causing a core fluid to flow into a channel between two sheath flows of one or more sheath fluids different from the core fluid, wherein a dielectric constant of a fluid constituting either sheath flow is less than a dielectric constant of the core fluid, and wherein flow in the channel is laminar; and
determining impedance in the channel based on measurements at a first pair of one or more pairs of electrodes, wherein
the core fluid comprises polar molecules and the sheath fluid comprises non-polar molecules, and
a width of the core between the sheath flows in the channel is controlled, at least in part, by a width of a strip of material with affinity for the polarity of the core fluid in at least one of a top wall or a bottom wall of the channel.

20. A method comprising:
causing a core fluid to flow into a channel between two sheath flows of one or more sheath fluids different from the core fluid, wherein a dielectric constant of a fluid constituting either sheath flow is less than a dielectric constant of the core fluid, and wherein flow in the channel is laminar; and
determining impedance in the channel based on measurements at a first pair of one or more pairs of electrodes, wherein
the core fluid comprises polar molecules and the sheath fluid comprises non-polar molecules, and
a width of the core between the sheath flows in the channel is controlled, at least in part, by topographical features on at least one of a top wall or a bottom wall of the channel, which features extend into the channel.

21. A method as recited in claim 1, wherein the sheath fluid is mineral oil and the core fluid is an aqueous mixture.

22. A method as recited in claim 1, wherein the sheath fluid is a fluorocarbon solvent and the core fluid is an aqueous mixture.

23. A method as recited in claim 1, wherein the sheath fluid is a gas.

24. A method as recited in claim 23, wherein the gas is air.

25. A method as recited in claim 1, wherein the method further comprises measuring an optical property in the channel.

26. A method as recited in claim 1, wherein the core fluid has a higher index of refraction for optical waves than do the one or more sheath fluids.

27. A method as recited in claim 26, wherein measuring the optical property further comprises directing incident light to produce total internal reflection within a core flow that encompasses the core fluid.

28. A method as recited in claim 1, further comprising determining impedance in the channel at a plurality of pairs of electrodes disposed separately along the channel and disposed separately from the first pair of electrodes.

29. A method as recited in claim 1, wherein
determining impedance of the particle in the core fluid further comprises normalizing features of measured impedance based, at least in part, on measured value of impedance for at least one particle of the internal control.

30. A method comprising:
causing a core fluid to flow into a channel between two sheath flows of one or more sheath fluids different from the core fluid, wherein an optical index of refraction of a fluid constituting either sheath flow is less than an optical index of refraction of the core fluid;
measuring an optical property in the channel between an optical source and an optical detector;
determining a value for a property of a particle in the core fluid based on the optical property measured; and
introducing a plurality of uniform particles of known value for the optical property into the core fluid as an internal control.

31. A method as recited in claim 30, further comprising determining impedance in the channel based on measurements at a first pair of one or more pairs of electrodes.

32. A method as recited in claim 30, wherein measuring the optical property further comprises directing incident light to produce total internal reflection within a core flow that encompasses the core fluid.

33. A method as recited in claim 30, further comprising determining a property of a core flow that encompasses the core fluid based on the optical property measured.

34. An apparatus comprising:
means for causing a core fluid to flow into a channel between two sheath flows of one or more sheath fluids different from the core fluid, wherein a dielectric constant of a fluid constituting either sheath flow is less than a dielectric constant of the core fluid, and wherein flow in the channel is laminar;
means for determining impedance in the channel based on measurements at a first pair of one or more pairs of electrodes;
means for determining impedance of a particle in the core fluid; and
means for introducing a plurality of uniform particles of known impedance value into the core fluid as an internal control.

35. A non-transitory computer-readable medium carrying one or more sequences of instructions, wherein execution of the one or more sequences of instructions by one or more processors causes an apparatus to:
receive first data indicating measurements of impedance in a channel between a first pair of electrodes, wherein a core fluid flows into the channel between two sheath flows of one or more sheath fluids different from the core fluid, wherein a dielectric constant of a fluid constituting either sheath flow is less than a dielectric constant of the core fluid, wherein flow in the channel is laminar, and wherein a plurality of uniform particles of known impedance value are introduced into the core fluid as an internal control; and
determine impedance of a particle in the core fluid based at least in part on the first data.

36. A non-transitory computer-readable medium as recited in claim 35, wherein the apparatus is further caused to determine control data that indicates, at least in part, relative pressure of a source of the core fluid compared to pressure of a source of one or more of the sheath fluids.

37. A non-transitory computer-readable medium as recited in claim 36, wherein to determine control data further comprises to determine control data to stabilize a value of the first data.

38. A non-transitory computer-readable medium as recited in claim 36, wherein:
the apparatus is further caused to receive second data that indicates measurements of a property of the core fluid; and
to determine control data further comprises to determine control data to stabilize a value of the second data.

39. A non-transitory computer-readable medium as recited in claim 38, wherein the second data indicates measurements of width of the core fluid.

40. An apparatus comprising:
means for receiving first data indicating measurements of an optical property in a channel between an optical source and optical detector, wherein a core fluid flows into the channel between two sheath flows of one or more sheath fluids different from the core fluid, wherein an index of refraction of a fluid constituting either sheath flow is less than an index of refraction of the core fluid, and wherein flow in the channel is laminar;
means for determining the optical property of a particle in the core fluid based at least in part on the first data; and
means for introducing a plurality of uniform particles of known value for optical property into the core fluid as an internal control.

41. A method comprising:
causing a core fluid to flow into a channel between two sheath flows of one or more sheath fluids different from the core fluid, wherein a value of a first electromagnetic property of a fluid constituting either sheath flow is different from a value of the first electromagnetic property of the core fluid, and wherein flow in the channel is laminar;
measuring a second electromagnetic property in the channel using an electromagnetic signal that is concentrated in the core fluid by a difference in the value of the first electromagnetic property of either sheath flow and the value of the first electromagnetic property of the core fluid;
determining a value of a property of a particle in the core fluid; and
introducing a plurality of uniform particles of known value for the property into the core fluid as an internal control.

42. A method as recited in claim 1, wherein an electric field passes predominately through the core fluid rather than the one or more sheath fluids.

43. A method as recited in claim 30, wherein light is focused in the core fluid rather than the one or more sheath fluids.

44. An apparatus as recited in claim 34, wherein an electric field passes predominately through the core fluid rather than the one or more sheath fluids.

45. A non-transitory computer-readable medium as recited in claim 35, wherein an electric field passes predominately through the core fluid rather than the one or more sheath fluids.

46. An apparatus as recited in claim 40, wherein light is focused in the core fluid rather than the one or more sheath fluids.

47. An apparatus comprising:
a channel comprising a strip of material with affinity for a polarity of a core fluid in at least one of a top wall or a bottom wall of the channel;
means for causing the core fluid to flow into the channel between two sheath flows of one or more sheath fluids different from the core fluid, wherein a dielectric constant of a fluid constituting either sheath flow is less than a dielectric constant of the core fluid, and wherein flow in the channel is laminar; and
means for determining impedance in the channel based on measurements at a first pair of one or more pairs of electrodes,
wherein
the core fluid comprises polar molecules and the sheath fluid comprises non-polar molecules, and
a width of the core between the sheath flows in the channel is controlled, at least in part, by a width of the strip.

48. An apparatus comprising:
topographical features on at least one of a top wall or a bottom wall of a channel, which features extend into the channel,
means for causing a core fluid to flow into a channel between two sheath flows of one or more sheath fluids different from the core fluid, wherein a dielectric constant of a fluid constituting either sheath flow is less than a dielectric constant of the core fluid, and wherein flow in the channel is laminar; and means for determining impedance in the channel based on measurements at a first pair of one or more pairs of electrodes, wherein the core fluid comprises polar molecules and the sheath fluid comprises non-polar molecules, and a width of the core fluid between the sheath flows in the channel is controlled, at least in part, by the topographical features.

* * * * *